United States Patent
Yoshioka

(10) Patent No.: US 9,470,188 B2
(45) Date of Patent: Oct. 18, 2016

(54) FAILURE DETECTION DEVICE FOR EXHAUST RECIRCULATION APPARATUS OF ENGINE WITH SUPERCHARGER

(71) Applicant: AISAN KOGYO KABUSHIKI KAISHA, Obu-shi, Aichi (JP)

(72) Inventor: Mamoru Yoshioka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 66 days.

(21) Appl. No.: 14/319,603

(22) Filed: Jun. 30, 2014

(65) Prior Publication Data
US 2015/0007564 A1   Jan. 8, 2015

(30) Foreign Application Priority Data

Jul. 8, 2013 (JP) ................................ 2013-142664

(51) Int. Cl.
| | |
|---|---|
| F02B 33/44 | (2006.01) |
| F02B 37/00 | (2006.01) |
| F02M 25/07 | (2006.01) |
| F02B 37/18 | (2006.01) |

(52) U.S. Cl.
CPC .............. F02M 26/49 (2016.02); F02B 37/00 (2013.01); F02M 25/0702 (2013.01); F02B 37/18 (2013.01)

(58) Field of Classification Search
CPC ... F02B 37/00; F02B 37/18; F02M 25/0702; Y02T 10/121
See application file for complete search history.

(56) References Cited

U.S. PATENT DOCUMENTS

| | | | | |
|---|---|---|---|---|
| 6,076,502 | A | 6/2000 | Katashiba et al. | |
| 7,275,525 | B2 * | 10/2007 | Miyasako | F02B 77/082 |
| | | | | 123/568.16 |
| 7,565,901 | B2 * | 7/2009 | Furuta | F02B 47/08 |
| | | | | 123/568.16 |

(Continued)

FOREIGN PATENT DOCUMENTS

| | | | |
|---|---|---|---|
| JP | A-10-266901 | 10/1998 | |
| JP | 2008-196444 A | 8/2008 | |
| JP | WO 2009130563 A1 * | 10/2009 | ......... F02D 41/0055 |

(Continued)

OTHER PUBLICATIONS

English Translation JP2010127243, Matsumoto Tkashi, May 30, 2012.*
Aug. 23, 2016 Office Action issued in Japanese Patent Application No. 2013-142664.

*Primary Examiner* — Jesse Bogue
(74) *Attorney, Agent, or Firm* — Oliff PLC

(57) ABSTRACT

In an engine with a supercharger, a low pressure loop EGR apparatus includes a EGR passage to allow part of exhaust gas discharged from a combustion chamber of the engine to an exhaust passage to flow as EGR gas in an intake passage to return to the combustion chamber, and a EGR valve to regulate a flow of EGR gas in the EGR passage. The EGR passage has an inlet connected to the exhaust passage downstream of a turbine and an outlet connected to the intake passage upstream of a compressor. An ECU controls the EGR valve while the engine is in a predetermined operating condition, and determines whether or not the EGR valve is failed based on changes in intake amount in the intake passage during control of the EGR valve.

9 Claims, 17 Drawing Sheets

(56) References Cited

U.S. PATENT DOCUMENTS

| | | | |
|---|---|---|---|
| 2007/0246028 A1* | 10/2007 | Fujita | F02D 41/0052 123/568.12 |
| 2011/0023846 A1* | 2/2011 | Miyazaki | F02M 25/07 123/568.16 |
| 2012/0095664 A1 | 4/2012 | Nakamura et al. | |
| 2012/0272646 A1* | 11/2012 | Moritani | F02D 41/0077 60/605.2 |
| 2013/0104859 A1* | 5/2013 | Miyazaki | F02D 41/0077 123/568.21 |
| 2013/0133634 A1 | 5/2013 | Hiraoka et al. | |

FOREIGN PATENT DOCUMENTS

| | | |
|---|---|---|
| JP | A-2010-127243 | 6/2010 |
| JP | A-2011-252399 | 12/2011 |
| JP | A-2012-7547 | 1/2012 |
| JP | A-2012-87676 | 5/2012 |
| JP | A-2012-87754 | 5/2012 |
| JP | 2013-113180 A | 6/2013 |
| WO | 2011/024294 A1 | 3/2011 |

* cited by examiner

FIG. 4

| TA \ NE | 800 | 1200 | 1600 | 2000 | 2400 | ~ | 4400 | 4800 | 5200 |
|---|---|---|---|---|---|---|---|---|---|
| 0 | 2 | 2.5 | 3 | 3.5 | 4 | ~ | 4.5 | 5 | 5 |
| 10 | 9 | 9 | 10 | 10 | 11 | ~ | 11 | 12 | 12 |
| 20 | 15 | 15 | 16 | 16 | 17 | ~ | 17 | 18 | 18 |
| 30 | 18 | 19 | 19 | 20 | 20 | ~ | 21 | 22 | 22 |
| 40 | 20 | 25 | 26 | 27 | 28 | ~ | 29 | 30 | 30 |
| ... | ... | ... | ... | ... | ... | ... | ... | ... | ... |
| 80 | 20 | 30 | 35 | 45 | 52 | ~ | 120 | 130 | 140 |
| 90 | 20 | 30 | 42 | 55 | 62 | ~ | 125 | 135 | 145 |
| 100 | 20 | 30 | 45 | 60 | 70 | ~ | 130 | 140 | 150 |

FIG. 8

| TA \ NE | 800 | 1200 | 1600 | 2000 | 2400 | ~ | 4400 | 4800 | 5200 |
|---|---|---|---|---|---|---|---|---|---|
| 0 | 2 | 2.5 | 3 | 3.5 | 4 | ~ | 4.5 | 5 | 5 |
| 10 | 7 | 7.2 | 8 | 8.3 | 8.8 | ~ | 8.8 | 9.6 | 9.6 |
| 20 | 11.3 | 11.5 | 12 | 12.3 | 12.8 | ~ | 12.8 | 14.4 | 15.3 |
| 30 | 14 | 14.3 | 14.5 | 15 | 15.5 | ~ | 16.2 | 17.6 | 18.7 |
| 40 | 18 | 18.8 | 19.5 | 20.3 | 21 | ~ | 21.5 | 22 | 25 |
| ... | ... | ... | ... | ... | ... | ... | ... | ... | ... |
| 80 | 18 | 22.5 | 26.2 | 33.8 | 39 | ~ | 120 | 130 | 140 |
| 90 | 20 | 30 | 42 | 55 | 62 | ~ | 125 | 135 | 145 |
| 100 | 20 | 30 | 45 | 60 | 70 | ~ | 130 | 140 | 150 | kGao

FAILURE DETECTION DEVICE FOR EXHAUST RECIRCULATION APPARATUS OF ENGINE WITH SUPERCHARGER

CROSS-REFERENCE TO RELATED APPLICATIONS

This application is based upon and claims the benefit of priority from the prior Japanese Patent Application No. 2013-142664 filed on Jul. 8, 2013, the entire contents of which are incorporated herein by reference.

BACKGROUND OF THE INVENTION

1. Field of the Invention

The present invention relates to an exhaust gas recirculation apparatus to allow part of exhaust gas discharged from an engine with a supercharger to an exhaust passage to flow as exhaust recirculation gas in an intake passage to return to the engine, and more particularly to a failure detection device configured to detect a failure of the exhaust recirculation apparatus.

2. Related Art

Conventionally, a technique of the above type is employed in a vehicle engine, for example. An exhaust gas recirculation (EGR) apparatus is arranged to introduce part of exhaust gas after combustion, which is discharged from a combustion chamber of an engine to an exhaust passage, into an intake passage as EGR gas through an EGR passage so that the exhaust gas is mixed with intake air flowing in the intake passage and returns to the combustion chamber. The EGR gas flowing in the EGR passage is regulated by an EGR valve provided in the EGR passage. This EGR can reduce mainly nitrogen oxide (NOx) in the exhaust gas and improve fuel consumption during a partial load operation of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby suppressing the occurrence of NOx. In a gasoline engine, even when the content of oxygen in intake air is not increased by EGR and a throttle valve is closed to some degree, it is possible to reduce pumping loss of the engine.

Herein, recently, it is conceivable to perform EGR in the entire operating region of the engine in order to further improve fuel consumption. Realization of high EGR rates is thus demanded. To realize the high EGR rates, it is necessary for conventional arts to increase the internal diameter of an EGR passage or increase the opening area of a flow passage provided by a valve element and a valve seat of an EGR valve.

Meanwhile, in case a failure occurs in an EGR apparatus, it may interfere with appropriate EGR control, leading to the occurrence of knocking in an engine or the deterioration in exhaust emission of the engine. Therefore, there is conventionally proposed a failure detection device configured to diagnose the presence/absence of a failure of the EGR apparatus, inform a driver of such a fact in case a failure is detected, and store the fact in a storage device.

JP-A-2011-252399 discloses a technique of the above type for failure detection. In this technique, an intake pressure sensor actually measures intake pressure in an intake passage when an EGR valve is controlled to open and close and also an expected intake pressure to be realized by the control to open and close the EGR valve is estimated. By comparison between an actual measured value and an estimated value of the intake pressure, it is determined whether or not a failure of the EGR apparatus is present. If the failure is determined to be present, the type of that failure is determined. Herein, if the actual measured value of the intake pressure is different from the estimated value, it means that the intake pressure did not vary even when the EGR valve was controlled to open and close. It is thus possible to determine that the EGR valve is failed.

Furthermore, it is well known to adopt an EGR apparatus of an engine with a supercharger. JP-A-2012-007547 describes an EGR apparatus adopted in an engine with a supercharger. This engine is provided with a supercharger consisting of a turbine placed in an exhaust passage and a compressor placed in an intake passage and driven by the turbine. In this EGR apparatus, an inlet of an EGR passage is connected to the exhaust passage downstream of the turbine and an outlet of the EGR passage is connected to the intake passage upstream of the compressor, whereby constituting a low pressure loop EGR apparatus.

SUMMARY OF INVENTION

Problems to be Solved by the Invention

Meanwhile, it is conceived that the low pressure loop EGR apparatus disclosed in JP-A-2012-007547 is also provided with a failure detection device. However, even if the low pressure loop EGR apparatus adopts the technique of failure detection disclosed in JP-A-2011-252399, the intake pressure does not vary only by controlling the EGR valve to open and close. Thus, it is impossible to determine whether or not the EGR apparatus is failed by comparison between an actual measured value and an estimated value of the intake pressure.

In the low pressure loop EGR apparatus, therefore, it is conceivable to use a temperature sensor instead of the intake pressure sensor to detect a failure of the EGR apparatus. Specifically, the temperature sensor is placed in the intake passage downstream of the outlet of the EGR passage to actually measure the temperature of gas flowing in the intake passage when the EGR valve is controlled to open and close to thereby determine whether or not EGR gas has flowed in the intake passage. This can determine whether or not the EGR valve is normally operated to open and close, that is, whether or not the EGR apparatus is normal. In this case, however, the temperature sensor for failure detection has to be additionally provided, resulting in a cost increase of the EGR apparatus by just that much.

The present invention has been made in view of the circumstances and has a purpose to provide a failure detection device for an exhaust recirculation apparatus of an engine with a supercharger, the failure detection device being configured to enable effective detection of a failure of an exhaust recirculation valve without separately providing any additional unit or means for failure detection in a low pressure loop exhaust recirculation apparatus.

Means of Solving the Problems

To achieve the above purpose, one aspect of the invention provides a failure detection device for an exhaust recirculation apparatus of an engine with a supercharger, the engine including an intake passage, an exhaust passage, and a fuel supply unit to supply fuel to a combustion chamber, the intake passage being provided with an intake regulating valve to regulate an intake amount flowing in the intake passage, the supercharger including a compressor placed in the intake passage upstream of the intake regulating valve, a turbine placed in the exhaust passage, and a rotary shaft connecting the compressor and the turbine so that they are integrally rotatable, the exhaust recirculation apparatus including: an exhaust recirculation passage to allow part of exhaust gas discharged from the combustion chamber of the engine to the exhaust passage to flow as exhaust recirculation gas to the intake passage to return to the combustion chamber; and an exhaust recirculation valve to regulate a flow of the exhaust recirculation gas in the exhaust recirculation passage, and the exhaust recirculation passage having an inlet connected to the exhaust passage downstream of the turbine and an outlet connected to the intake passage upstream of the compressor, wherein the failure detection device includes a failure determining unit configured to control the exhaust recirculation valve while the engine is in a predetermined operating condition and further determine whether or not the exhaust recirculation valve is failed based on changes in intake amount in the intake passage caused by the exhaust recirculation valve under control.

Another aspect of the invention provides a failure detection device for an exhaust recirculation apparatus of an engine with a supercharger, the engine including an intake passage, an exhaust passage, and a fuel supply unit to supply fuel to a combustion chamber, the intake passage being provided with an intake regulating valve to regulate an intake amount flowing in the intake passage, the supercharger including a compressor placed in the intake passage upstream of the intake regulating valve, a turbine placed in the exhaust passage, and a rotary shaft connecting the compressor and the turbine so that they are integrally rotatable, the exhaust recirculation apparatus including: an exhaust recirculation passage to allow part of exhaust gas discharged from the combustion chamber of the engine to the exhaust passage to flow as exhaust recirculation gas to the intake passage to return to the combustion chamber; and an exhaust recirculation valve to regulate a flow of the exhaust recirculation gas in the exhaust recirculation passage, and the exhaust recirculation passage having an inlet connected to the exhaust passage downstream of the turbine and an outlet connected to the intake passage upstream of the compressor, wherein the failure detection device includes a failure determining unit configured to determine whether or not the exhaust recirculation valve is failed based on changes in combustion state of the fuel in the combustion chamber supplied by the fuel supply unit while the engine is in a predetermined operating condition.

Advantageous Effects of Invention

According to the present invention, it is possible to effectively detect a failure in an exhaust recirculation valve without separately providing any additional unit or means for failure detection in a low pressure loop exhaust recirculation apparatus.

BRIEF DESCRIPTION OF THE DRAWINGS

FIG. 4 is an estimated intake amount map to be referred to in order to find an estimated intake amount during valve closing of the EGR valve in the first embodiment;

FIG. 8 is an estimated intake amount map to be referred to in order to find an estimated intake amount during valve opening of the EGR valve in the fourth embodiment;

DESCRIPTION OF EMBODIMENTS

<First Embodiment>

A detailed description of a first embodiment of a failure detection device for an exhaust gas recirculation apparatus of an engine with a supercharger (a supercharger-equipped engine) embodying the present invention will now be given referring to the accompanying drawings.

Figure 1:
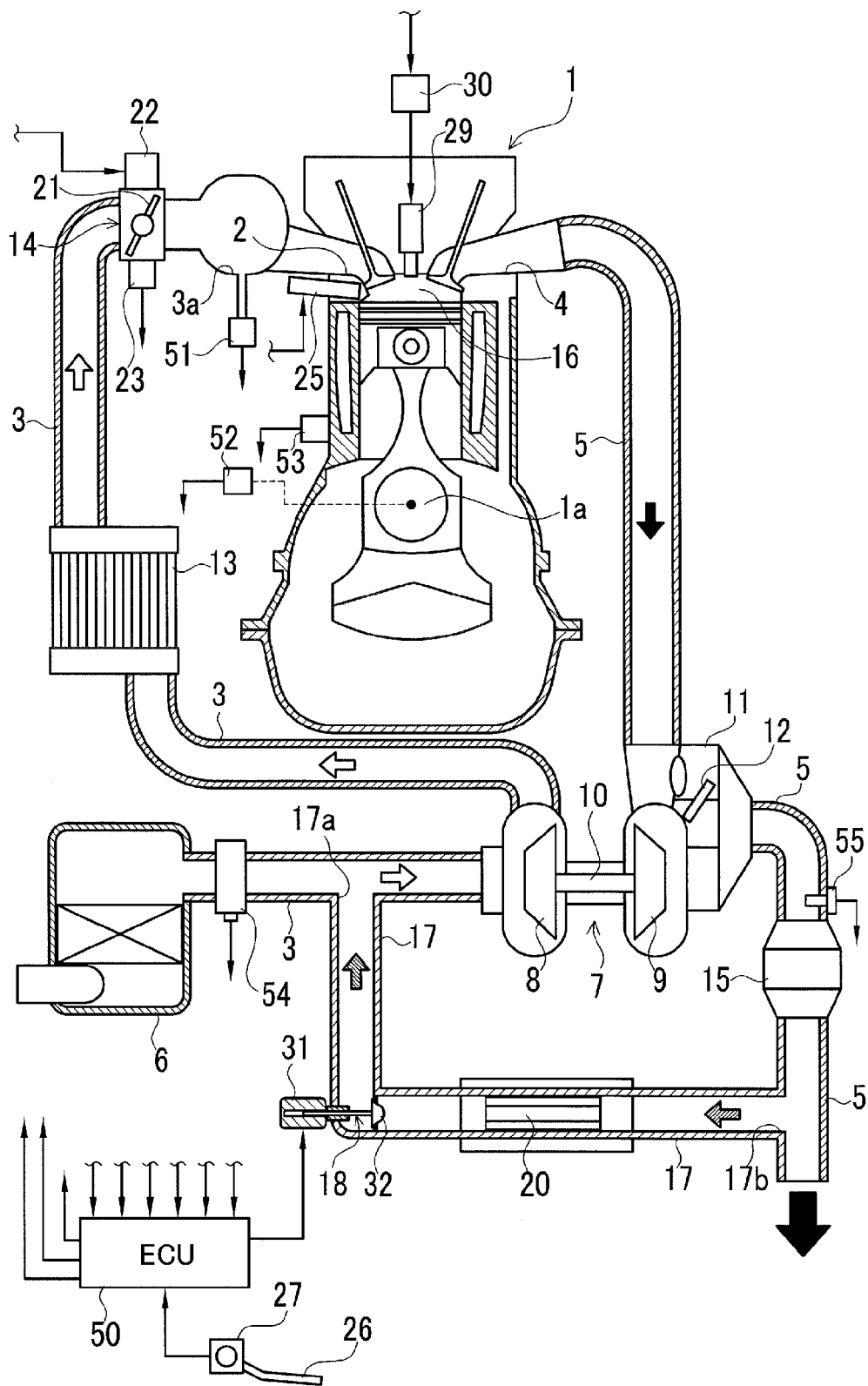
FIG. 1 is a schematic configuration view showing an engine system including an EGR apparatus of an engine with a supercharger in a first embodiment.

FIG. 1 is a schematic configuration view showing an engine system including an exhaust gas recirculation (EGR) apparatus of a supercharger-equipped engine in the present embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream of the air cleaner 6, a supercharger 7 is placed in a position between a portion of the intake passage 3 and a portion of the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure increased by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream of the intercooler 13 but upstream of the surge tank 3a. This throttle device 14 corresponding to one example of an intake regulating valve of the invention includes a butterfly-shaped throttle valve 21 placed in the intake passage 3, a step motor 22 to drive the throttle valve 21 to open and close, and a throttle sensor 23 to detect an opening degree or position (a throttle opening degree) TA of the throttle valve 21. The throttle sensor 23 corresponds to one example of an opening degree detecting unit of the present invention. The throttle device 14 is configured so that the throttle valve 21 is driven by the step motor 22 to open and close according to operation of an accelerator pedal 26 by a driver to adjust the opening degree of the throttle valve 21. The configuration of this throttle device 14 can be provided by for example a basic configuration of a "throttle device" disclosed in JP-A-2011-252482, FIGS. 1 and 2. In the exhaust passage 5 downstream of the turbine 9, a catalytic converter 15 is provided as an exhaust catalyst to clean exhaust gas.

The engine 1 is further provided with an injector(s) 25 to inject and supply fuel into a combustion chamber(s) 16. The injector 25 is configured to be supplied with the fuel from a fuel tank (not shown). The engine 1 is further provided with an ignition plug 29 in each cylinder. Each of the ignition plugs 29 ignites in response to high voltage output from an igniter 30. An ignition timing of each ignition plug 29 is determined by output timing of the high voltage from the igniter 30. The ignition plugs 29 and the igniter 30 constitute an ignition device.

In the present embodiment, the EGR apparatus to enable high EGR rates is a low pressure loop system and includes an exhaust gas recirculation (EGR) passage 17 allowing part of exhaust gas discharged from the combustion chamber 16 of the engine 1 to the exhaust passage 5 to flow in the intake passage 3 and return to the combustion chamber 16, and an exhaust gas recirculation (EGR) valve 18 placed in the EGR passage 17 to regulate an exhaust gas flow rate (EGR flow rate) in the EGR passage 17. The EGR passage 17 is provided to extend between the exhaust passage 5 downstream of the catalytic converter 15 and the intake passage 3 upstream of the compressor 8. Specifically, an outlet 17a of the EGR passage 17 is connected to the intake passage 3 upstream of the compressor 8 in order to allow a part of exhaust gas flowing in the exhaust passage 5 to flow as EGR gas into the intake passage 3 and return to the combustion chamber 16. An inlet 17b of the EGR passage 17 is connected to the exhaust passage 5 downstream of the catalytic convertor 15.

In the EGR passage 17, an EGR cooler 20 is provided to cool EGR gas flowing in the EGR passage 17. In the present embodiment, the EGR valve 18 is located in the EGR passage 17 downstream of the EGR cooler 20.

Figure 2:
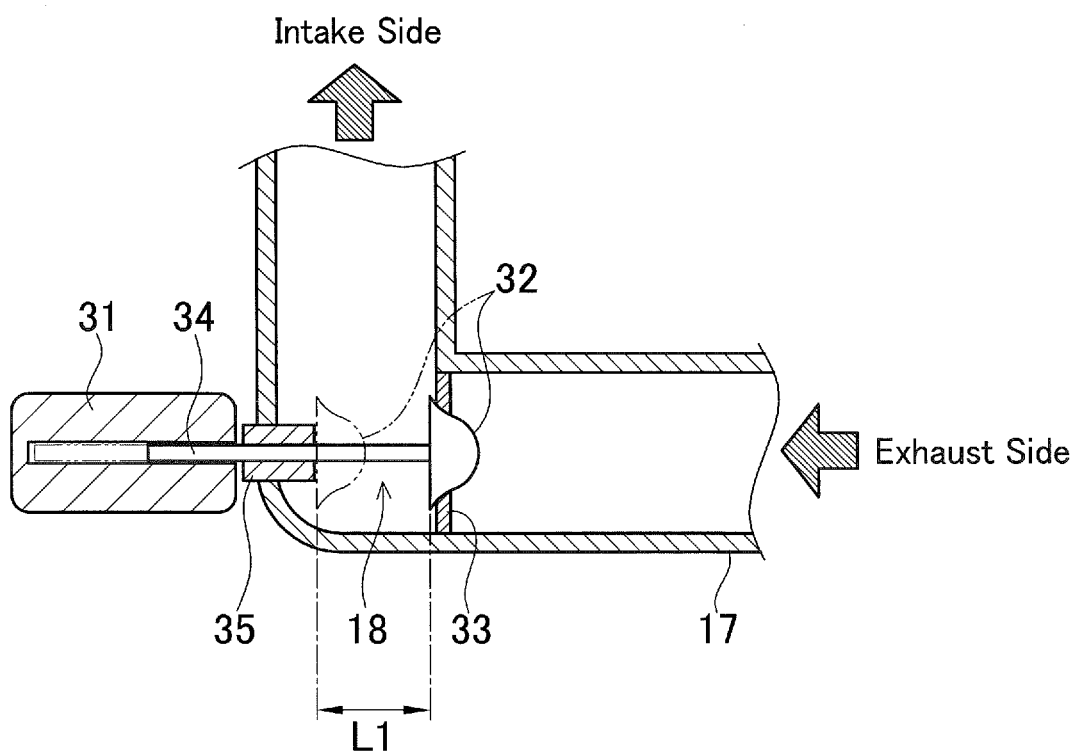
FIG. 2 is an enlarged cross sectional view of a part of an EGR passage, in which an EGR valve is provided in the first embodiment.

FIG. 2 is an enlarged cross sectional view of a part of the EGR passage 17 in which the EGR valve 18 is provided. As shown in FIGS. 1 and 2, the EGR valve 18 is configured as a poppet valve and a motor-operated valve. Specifically, the EGR valve 18 is provided with a valve element 32 to be driven by a DC motor 31. The valve element 32 has an almost conical shape and is configured to seat on a valve seat 33 provided in the EGR passage 17. The DC motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the DC motor 31 is performed to adjust the opening degree of the valve element 32 with respect to the valve seat 33. The output shaft 34 of the EGR valve 18 is provided to be able to make stroke movement by a predetermined stroke L1 between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR rates. Accordingly, the valve element 32 is also designed with large size. As the structure of the above EGR valve 18, for example, a basic structure of an "EGR valve" disclosed in FIG. 1 of JP-A-2010-275941 can be adopted.

In the present embodiment, for respectively executing fuel injection control, ignition timing control, intake amount control, EGR control, and other controls according to the operating condition of the engine 1, an electronic control unit (ECU) 50 controls the injectors 25, the igniter 30, the step motor 22 of the electronic throttle device 14, and the DC motor 31 of the EGR valve 18 according to the operating condition of the engine 1. The ECU 50 includes a central processing unit (CPU), various memories that store a predetermined control program and others in advance and that temporarily store computational results and others of the CPU, and an external input circuit and an external output circuit connected to each of them. The ECU 50 is one example of a failure determining unit of the invention. To the external output circuit, there are connected the igniter 30, the injectors 25, the step motor 22, and the DC motor 31. To the external input circuit, there are connected the throttle sensor 23 and various sensors 27 and 51-55 which correspond to one example of an operating condition detecting unit to detect the operating condition of the engine 1 and transmit various engine signals to the external input circuit.

In the present embodiment, the various sensors include the accelerator sensor 27, the intake pressure sensor 51, the rotation speed sensor 52, the water temperature sensor 53, the air flow meter 54, and the air-fuel ratio sensor 55 as well as the throttle sensor 23. The accelerator sensor 27 detects an accelerator opening degree ACC which is an operation amount of the accelerator pedal 26. This accelerator pedal 26 corresponds to one example of an operating unit to control the operation of the engine 1. The intake pressure sensor 51 detects intake pressure PM in the surge tank 3a. That is, the intake pressure sensor 51 is configured to detect intake pressure PM in the intake passage 3 (the surge tank 3a) downstream of a position in which EGR gas flows in the intake passage 3 from the EGR passage 17. The rotation speed sensor 52 detects the rotation angle (crank angle) of the crank shaft 1a of the engine 1 and also detects changes in crank angle as the rotation speed (engine rotation speed) NE of the engine 1. The rotation speed sensor 52 corresponds to one example of a rotation detecting unit and a combustion state detecting unit of the invention. The water temperature sensor 53 detects the cooling water temperature THW of the engine 1. The air flow meter 54 detects a flow amount Ga of intake air flowing in the intake passage 3 directly downstream of the air cleaner 6. The air flow meter 54 corresponds to one example of an intake amount measuring unit of the invention. The air-fuel ratio sensor 55 is placed in the exhaust passage 5 directly upstream of the catalytic convertor 15 to detect an air-fuel ratio AF in the exhaust gas. This sensor 55 corresponds to one example of an air-fuel ratio detecting unit of the invention.

In the present embodiment, the ECU 50 is configured to control the EGR valve 18 in the whole operating region of the engine 1 to control EGR according to the operating condition of the engine 1. On the other hand, the ECU 50 is arranged to normally control the EGR valve 18 to open based on an operating condition detected during acceleration operation or steady operation of the engine 1 and control the EGR valve 18 to close during stop of the engine 1, during idle operation, or during deceleration operation.

In the present embodiment, the ECU 50 is arranged to control the electronic throttle device 14 based on an accelerator opening degree ACC in order to drive the engine 1 in response to requests from a driver. The ECU 50 is further arranged to control the electronic throttle device 14 to open based on the accelerator opening degree ACC during acceleration operation or steady operation of the engine 1 and to control the electronic throttle device 14 to close during stop or deceleration operation of the engine 1. Accordingly, the throttle valve 21 is opened during acceleration operation or steady operation of the engine 1 and closed during stop or deceleration operation of the engine 1.

Herein, even the low pressure loop EGR apparatus of the present embodiment needs to perform effective failure detection for executing appropriate EGR control. In this embodiment, therefore, the ECU 50 executes the following processings in order to detect a failure of the low pressure loop EGR apparatus without separately providing any additional unit or means for failure detection.

Figure 3:
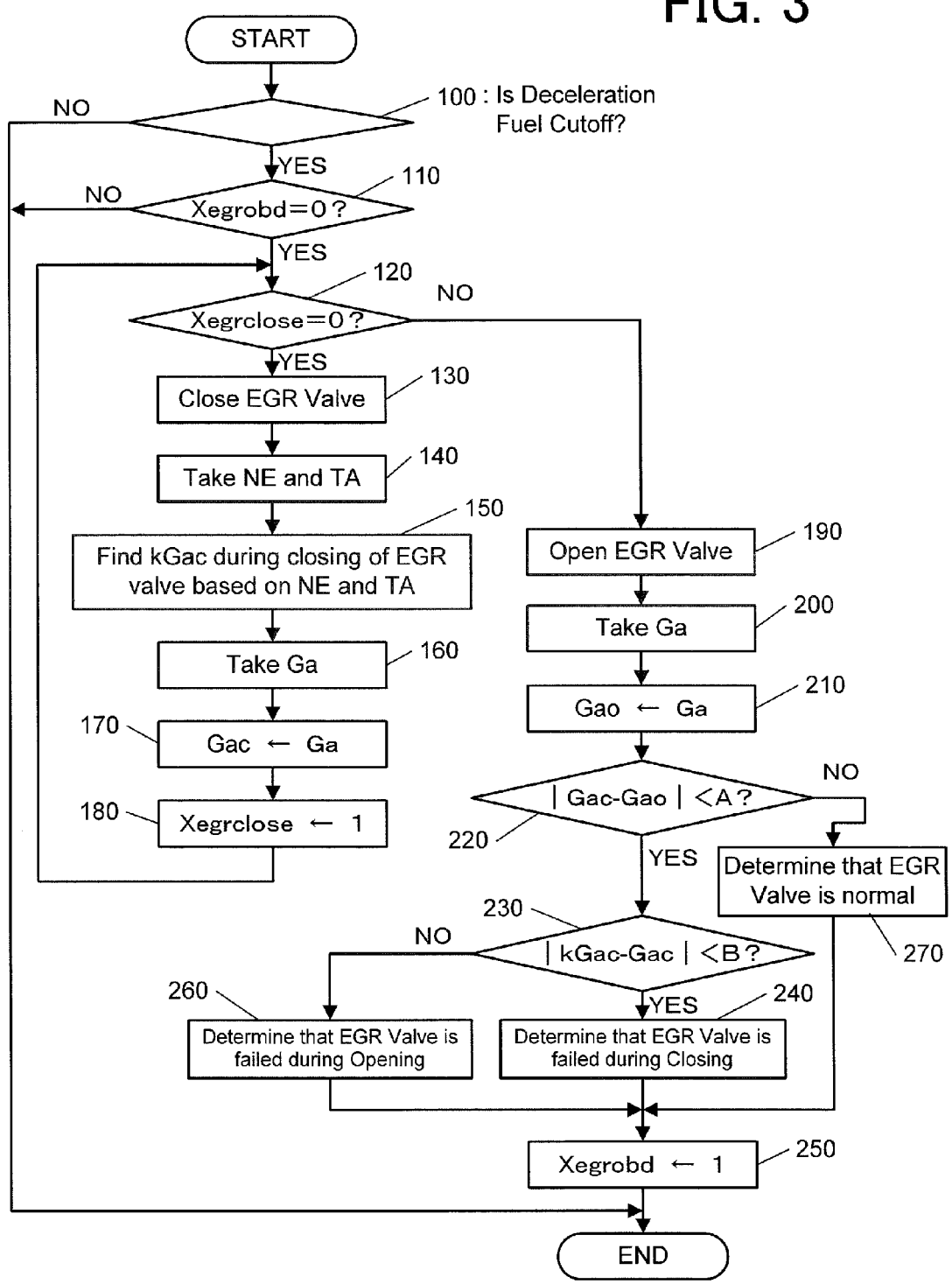
FIG. 3 is a flowchart showing one example of processing details to detect a failure of the EGR valve in the first embodiment.

FIG. 3 is a flowchart showing one example of details of the processing to detect a failure of the EGR valve 18. When the processing proceeds to this routine, the ECU 50 firstly determines in Step 100 whether or not the operating condition of the engine 1 is a deceleration fuel cutoff condition. That is, it is determined whether or not the engine 1 is in a deceleration operation and fuel supply to the engine 1 by the injectors 25 is cut off. This condition is referred to as "deceleration fuel cutoff". During the deceleration operation of the engine 1, as described above, the throttle valve 21 of the electronic throttle device 14 is controlled to fully close. The ECU 50 can make the above determination based on changes in accelerator opening degree ACC. If a negative determination (NO) is made in this Step 100, the ECU 50 immediately terminates the processing. If a positive determination (YES) is made in Step 100, the ECU 50 shifts the processing to Step 110.

In Step 110, the ECU 50 determines whether or not a failure determination flag Xegrobd is "0". Herein, the failure determination flag Xegrobd is set to "1" when the failure determination was performed, but set to "0" when the failure determination was not performed. If NO in Step 110, the ECU 50 immediately terminates the processing. If YES in Step 110, the ECU 50 advances the processing to Step 120.

In Step 120, the ECU 50 judges whether or not a valve-closing flag Xegrclose is "0". This valve-closing flag Xegrclose is set to "1" when the EGR valve 18 is being controlled to close, but set to "0" when the EGR valve 18 is not controlled to close. If NO in Step 120, the ECU 50 shifts the processing to Step 190. If YES in Step 120, on the other hand, the ECU 50 shifts the processing to Step 130.

In Step 130, the ECU 50 controls the EGR valve 18 to close. Thus, the EGR valve 18 remaining in a valve-open state is forcibly closed. Then, the EGR valve 18 is held in a valve-closed state.

In Step 140, successively, the ECU 50 takes, or reads, the engine rotation speed NE based on a detection value of the rotation speed sensor 52 and further takes the throttle opening degree TA based on a detection value of the throttle sensor 23.

In Step 150, the ECU 50 finds an estimated intake amount kGac during valve closing of the EGR valve 18 based on the engine rotation speed NE and the throttle opening degree TA. The ECU 50 can find this estimated intake amount kGac by referring to for example an estimated intake amount map shown in FIG. 4. In this map, the estimated intake amount kGac is set to be larger as the engine rotation speed NE is higher and the throttle opening degree TA is larger.

In Step 160, the ECU 50 then takes an intake amount Ga based on a measurement value of the air flow meter 54. In Step 170, the ECU 50 sets the taken intake amount Ga as an intake amount Gac during valve closing ("valve-closing intake amount Gac") obtained when the EGR valve 18 is closed.

In Step 180, the ECU 50 sets the valve closing flag Xegrclose to "1" and returns the processing to Step 120.

On the other hand, in Step 190 subsequent to Step 120, the ECU 50 controls to open the EGR valve 18 having been controlled to close. Thus, the EGR valve 18 in a valve-closed state is forcibly opened.

In Step 200, the ECU 50 takes an intake amount Ga based on a measurement value of the air flow meter 54. In Step 210, the ECU 50 successively sets the taken intake amount Ga as an intake amount Gao during valve opening ("valve-opening intake amount Gao") obtained when the EGR valve 18 is opened.

Subsequently, in Step 220, the ECU 50 determines whether or not an absolute value of a difference between the valve-closing intake amount Gac and the valve-opening intake amount Gao is smaller than a predetermined value A. Specifically, the ECU 50 determines whether or not the difference between the intake amount Ga actually measured when the EGR valve 18 is controlled to close and the intake amount Ga actually measured when the EGR valve 18 is controlled to open is smaller than the predetermined value A. If No in Step 220, the ECU 50 shifts the processing to Step 270. If YES in Step 220, the ECU 50 shifts the processing to Step 230.

In Step 270, since the difference between the valve-closing intake amount Gac and the valve-opening intake amount Gao is large, the ECU 50 determines the EGR valve 18 is normal, that is, the EGR valve 18 is functioning normally, and advances the processing to Step 250. At that time, the ECU 50 can store, in a memory, the fact that the EGR valve 18 is determined to be normal ("normality determination").

In Step 230, on the other hand, the ECU 50 determines whether or not an absolute value of a difference between the estimated intake amount kGac during valve closing and the valve-closing intake amount Gac is smaller than a predetermined value B. Specifically, the ECU 50 determines whether or not the difference between the estimated intake amount kGac and the actual measured intake amount Gac is smaller than the predetermined value B when the EGR valve 18 is controlled to close. If YES in Step 230, it is considered that the EGR valve 18 remains closed, the ECU 50 then determines in Step 240 that the EGR valve 18 is failed, that is, the EGR valve 18 is malfunctioning, in a closed state ("closed-valve failure determination") and shifts the processing to Step 250. At that time, the ECU 50 can notify a driver of the fact that the of closed-valve failure determination or store this fact in a memory.

If NO in Step 230, on the other hand, it is considered that the EGR valve 18 remains open, the ECU 50 determines that the EGR valve 18 is failed in the valve-open state ("open-valve failure determination") and shifts the processing to Step 250. At that time, the ECU 50 can notify a driver of the fact of open-valve failure determination or store this fact in a memory.

In Step 250 subsequent to Step 270, 240, or 260, the ECU 50 sets the failure determination flag Xegrobd to "1" and terminates the processing.

According to the above control, while the engine 1 is in a predetermined operating condition, the ECU 50 determines if the EGR valve 18 is failed based on changes in intake amount Ga in the intake passage 3 obtained when the EGR valve 18 is controlled. More specifically, while the engine 1 is in a deceleration operation and when fuel supply to the engine 1 by the injectors 25 is cut off, the ECU 50 forcibly closes the EGR valve 18 and then forcibly opens the same and determines if the EGR valve 18 is failed based on changes in intake amount Ga measured by the air flow meter 54.

According to the above control, furthermore, when the EGR valve 18 is determined failed, the ECU 50 finds the estimated intake amount kGac during valve closing of the EGR valve 18 based on the engine rotation speed NE and the throttle opening degree TA and also finds an actual measured value of the intake amount Ga by the air flow meter 54. The ECU 50 then compares the estimated intake amount kGac and the actual measured, valve-closing intake amount Gac to further determine whether the EGR valve 18 remaining open is failed ("open-valve failure") or the EGR valve 18 remaining closed is failed ("closed-valve failure").

According to the failure detection device of the present embodiment explained above, when the normal EGR valve 18 is controlled while the engine 1 is in a predetermined operating condition, a flow of EGR gas from the EGR passage 17 to the intake passage 3 changes, thereby changing the intake amount Ga flowing in the intake passage 3. Herein, in case the EGR valve 18 is failed, an estimated change in flow of EGR gas does not appear even when the EGR valve 18 is controlled. Thus, the intake amount Ga flowing in the intake passage 3 does not change as estimated. Accordingly, while the engine 1 is in a predetermined operating condition, when the ECU 50 controls the EGR valve 18 and determines the presence/absence of changes in intake amount Ga in the intake passage 3 at that time, the presence/absence of a failure of the EGR valve 18 is determined. To be more specific, during the deceleration operation of the engine 1 and when fuel supply to the engine 1 by the injectors 25 is cut off, that is, during deceleration fuel cutoff, the ECU 50 forcibly opens and closes the EGR valve 18 and determines whether or not the intake amount Ga measured by the air flow meter 54 changes, thereby determining the presence/absence of a failure of the EGR valve 18. Herein, the air flow meter 54 is used to detect the intake amount Ga representing the operating condition of the engine 1. Thus, there is no need to provide any additional unit or means for detecting a failure of the EGR valve 18. Consequently, during deceleration fuel cutoff of the engine 1, it is possible to effectively detect a failure of the EGR valve 18 without providing any additional unit or means for failure detection in the low pressure loop EGR apparatus.

According to the present embodiment, when the ECU 50 determines that the EGR valve 18 is failed, the ECU 50 finds the estimated intake amount kGac during valve closing of the EGR valve 18 based on the engine rotation speed NE and the throttle opening degree TA and also finds the actual measured value of the intake amount Ga. By comparing the estimated intake amount kGac and the intake amount Ga, the ECU 50 further determines whether the EGR valve 18 is in open-valve failure or closed-valve failure. This can further specify whether the EGR valve 18 is in open-valve failure or closed-valve failure.

<Second Embodiment>

A second embodiment embodying a failure detection device for an exhaust recirculation apparatus of a supercharger-equipped engine according to the invention will be explained in detail below referring to the accompanying drawings.

Like components or parts in each of the following embodiments to those in the first embodiment are assigned the same reference signs as those in the first embodiment and their details are not repeatedly explained below. The following embodiments will be therefore explained with a focus on differences from the first embodiment.

Figure 5:
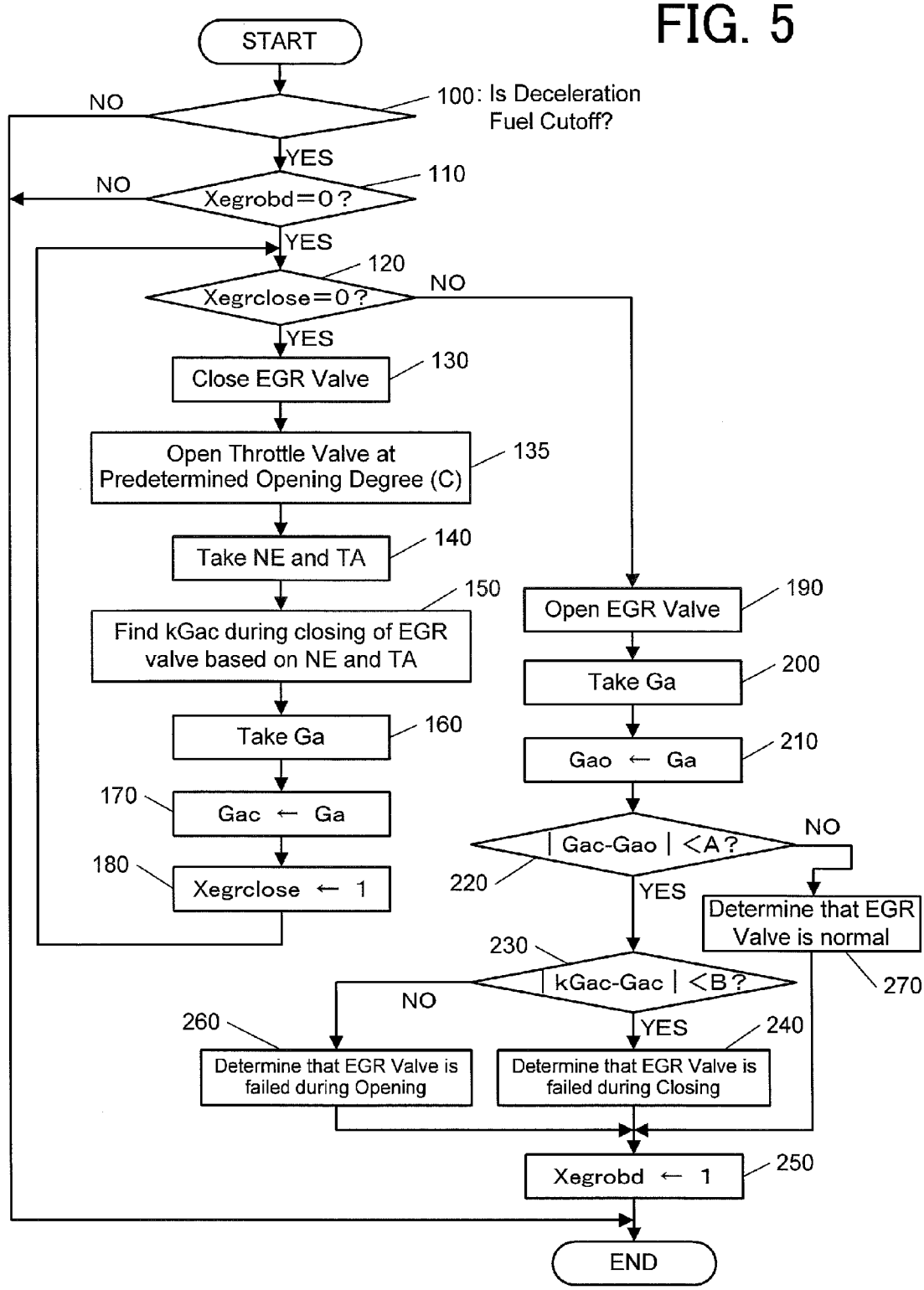
FIG. 5 is a flowchart showing one example of processing details to detect a failure in an EGR valve in a second embodiment.

The second embodiment differs from the first embodiment in the processing details of failure detection. FIG. 5 is a flowchart showing one example of the processing details for detecting a failure of the EGR valve 18 in the present embodiment. The flowchart of FIG. 5 is different from the flowchart of FIG. 3 in additionally including the processing of Step 135.

Specifically, the ECU 50 controls the EGR valve 18 to close in Step 130 and then controls the throttle valve 21 to open by a predetermined opening degree C. in Step 135. For this purpose, the ECU 50 controls the electronic throttle device 14. Herein, the predetermined opening degree C. can be set, as one example, to "10%" on the assumption that full open of the opening degree is "100%".

According to the above control, different from the first embodiment, during deceleration fuel cutoff of the engine 1, the ECU 50 forcibly closes the EGR valve 18 from a valve open state and also opens the throttle valve 21 to the predetermined opening degree C. and then determines whether or not the EGR valve 18 is failed based on changes in intake amount Ga measured by the air flow meter 54.

According to the failure detection device of the present embodiment explained above, the following operations and effects can be provided as well as the operations and effects in the first embodiment. In the present embodiment, specifically, since the throttle valve 21 is opened to the predetermined opening degree C. during deceleration operation of the engine 1, the intake amount taken in the combustion chamber 16 is increased by just that much, increasing exhaust pressure in the engine 1, thereby amplifying the change in the flow of EGR gas. This can improve the detection property (including detection accuracy) related to failures of the EGR valve 18.

<Third Embodiment>

A third embodiment embodying a failure detection device for an exhaust recirculation apparatus of a supercharger-equipped engine according to the invention will be explained in detail referring to the accompanying drawings.

Figure 6:
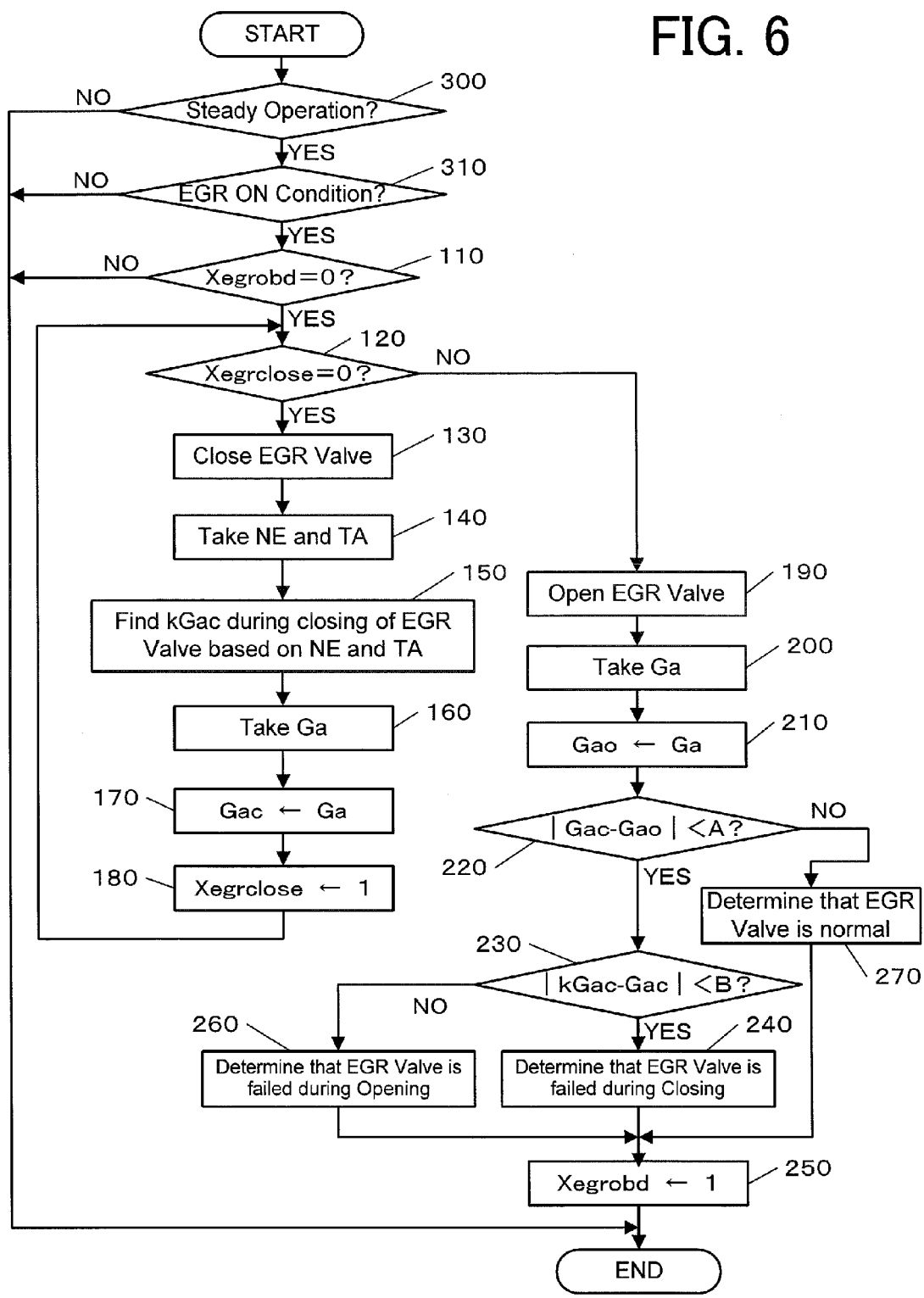
FIG. 6 is a flowchart showing one example of processing details to detect a failure in a EGR valve in a third embodiment.

The third embodiment differs from the first embodiment in the processing details of failure detection. FIG. 6 is a flowchart showing one example of the processing details for detecting a failure of the EGR valve 18 in the present embodiment. The flowchart of FIG. 6 differs from the flow chart of FIG. 3 in providing the processings in Steps 300 and 310 instead of the processing in Step 100 in the flowchart of FIG. 3.

When the processing proceeds to this routine, the ECU 50 determines in Step 300 whether or not the operating condition of the engine 1 is a steady operating condition (including a case where a vehicle is in a steady running condition). The ECU 50 can makes this determination for example based on the engine rotation speed NE, the throttle opening degree TA, and others. If NO in Step 300, the ECU 50 immediately terminates the processing. If YES in Step 300, the ECU 50 shifts the processing to Step 310.

In Step 310, the ECU 50 determines whether or not an EGR ON condition is established. Specifically, the ECU 50 judges whether or not the condition needing EGR control is established. If NO in Step 310, the ECU 50 immediately terminates the processing. If YES in Step 310, the ECU 50 shifts the processing to Step 110.

According to the above control, different from the first embodiment, during steady operation of the engine 1, the ECU 50 forcibly opens the EGR valve 18 from the valve-closed state and determines whether or not the EGR valve 18 is failed based on changes in intake amount Ga measured by the air flow meter 54.

According to the failure detection device in the present embodiment explained above, especially different from the operations and effects in the first embodiment, during steady operation of the engine 1, the ECU 50 forcibly opens and closes the EGR valve 18 and then determines the presence/absence of changes in intake amount Ga measured by the air flow meter 54, thereby determining the presence/absence of a failure of the EGR valve 18. Therefore, during steady operation of the engine 1, it is possible to effectively detect the failure of the EGR valve 18 without providing any additional unit or means for failure detection in the low pressure loop EGR apparatus.

According to the present embodiment, furthermore, when the ECU 50 determines the EGR valve 18 is failed, the ECU 50 finds the estimated intake amount kGa during valve closing of the EGR valve 18 based on the engine rotation speed NE detected by the rotation speed sensor 52 and the throttle opening degree TA detected by the throttle sensor 23 and also finds the actual measured value of the intake amount Ga. By comparing the estimated intake amount kGac and the intake amount Ga, the ECU 50 further determines whether the EGR valve 18 is in the open-valve failure or the closed-valve failure. Herein, since the rotation speed sensor 52 and the throttle sensor 23 are arranged respectively to detect the engine rotation speed NE and the throttle opening degree TA representing the operating condition of the engine 1, any additional unit or means for detecting a failure of the EGR valve 18 is not needed. Accordingly, it is possible to specify whether the EGR valve 18 is in the open-valve failure or the closed-valve failure without providing any separate sensor.

<Fourth Embodiment>

Next, a fourth embodiment embodying a failure detection device for an exhaust recirculation apparatus of a supercharger-equipped engine according to the present invention will be explained in detail referring to accompanying drawings.

Figure 7:
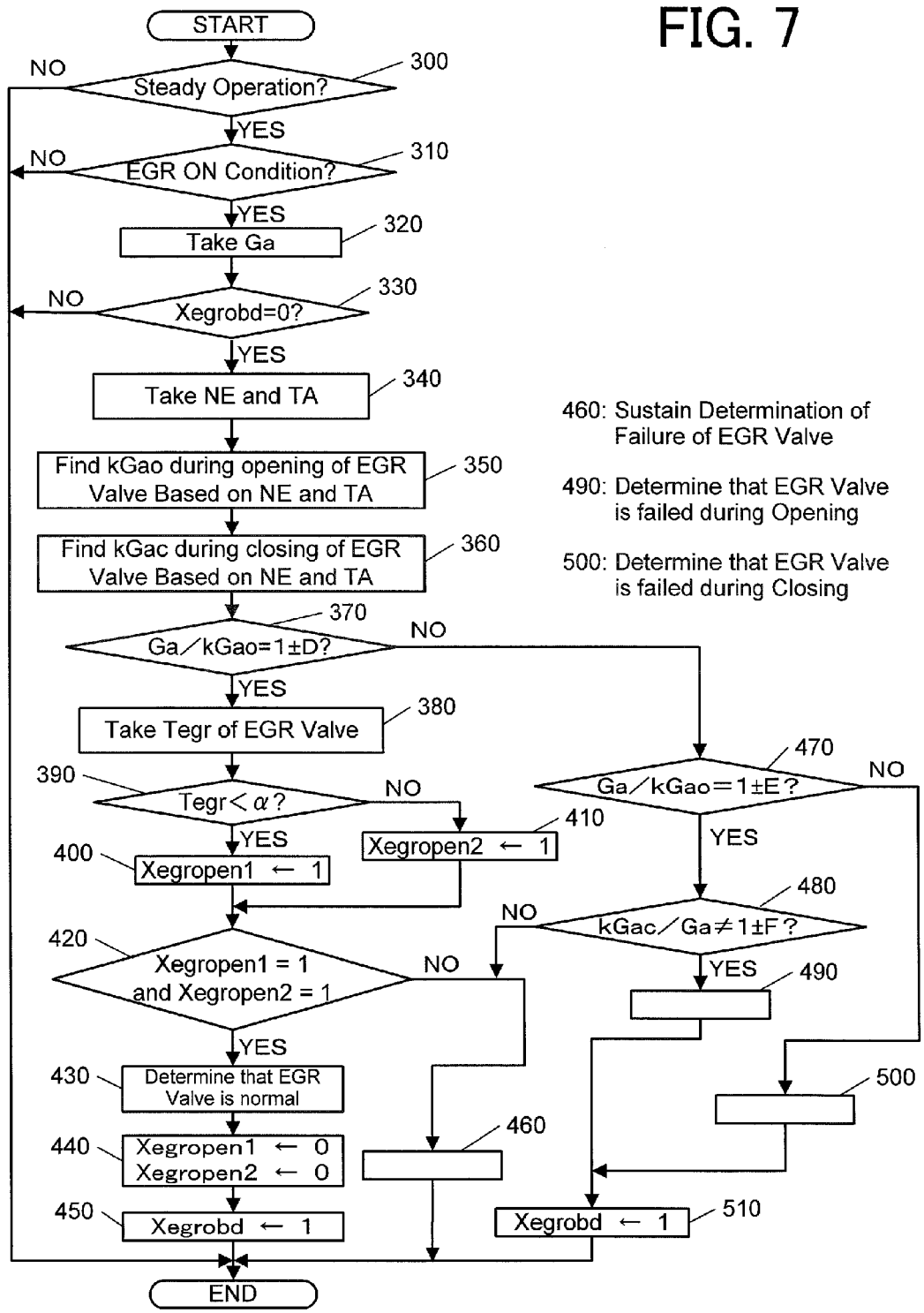
FIG. 7 is a flowchart showing one example of processing details to detect a failure in a EGR valve in a fourth embodiment.

The fourth embodiment differs from each of the above embodiments in the processing details for failure detection. FIG. 7 is a flowchart showing one example of the processing details to detect a failure of the EGR valve 18 in this embodiment. The flowchart of FIG. 7 is identical to the flowchart of FIG. 6 in Steps 300 and 310 and different from the flowchart of FIG. 6 in the remaining processings.

When the processing proceeds to this routine, the ECU 50 determines in Step 300 whether or not the engine 1 is during steady operation and then judges in Step 310 whether or not the EGR ON condition is established. If YES in Steps 300 and 310, the ECU 50 takes the intake amount Ga in Step 320. In this case, since the EGR ON condition is established, the EGR valve 18 is held in a valve-open state.

In Step 330, the ECU 50 successively determines whether or not a failure determination flag Xegrobd is "0". If NO in Step 330, the ECU 50 terminates subsequent processings. If YES in Step 330, the ECU 50 advances the processing to Step 340.

In Step 340, the ECU 50 takes the engine rotation speed NE and the throttle opening degree TA. In Step 350, the ECU 50 finds the estimated intake amount kGao during valve opening of the EGR valve 18 based on the taken engine rotation speed NE and throttle opening degree TA. The ECU 50 can find this estimated intake amount kGao by referring to for example an estimated intake amount map shown in FIG. 8. In this map, the estimated intake amount kGao is set larger as the engine rotation speed NE is higher and the throttle opening degree TA is larger.

In Step 360, the ECU 50 similarly finds an estimated intake amount kGac during valve closing of the EGR valve 18 based on the engine rotation speed NE and the throttle opening degree TA. The ECU 50 can find this estimated intake amount kGac by referring to for example the estimated intake amount map shown in FIG. 4.

In Step 370, the ECU 50 determines whether or not the ratio of an actual measured intake amount Ga to the estimated intake amount kGao during valve opening is equal to "1±D". Herein, the term "D" is a predetermined value less than 1 to define a margin of error. If YES in Step 370, the estimated intake amount kGao during valve opening is considered to be nearly equal to the actual measured intake amount Ga and the ECU 50 advances the processing to Step 380. If NO in Step 370, the estimated intake amount kGao during valve opening is not considered to be nearly equal to the actual measured intake amount Ga and the ECU 50 shifts the processing to Step 470.

In Step 380, the ECU 50 takes a target opening degree Tegr of the EGR valve 18. Herein, the target opening degree Tegr is separately calculated by the ECU 50 to execute EGR control.

In Step 390, the ECU 50 determines whether or not the taken target opening degree Tegr is smaller than a predetermined value α. If YES in Step 390, the ECU 50 advances the processing to Step 400. If NO in Step 390, the ECU 50 shifts the processing to Step 410.

In Step 400, the ECU 50 sets a small opening degree check flag Xegropen1 to "1". This flag Xegropen1 is set to "1" when the EGR valve 18 was subjected to failure check in a range where the target opening degree Tegr of the EGR valve 18 is smaller than the predetermined value α.

On the other hand, in Step 410, the ECU 50 sets a large opening degree check flag Xegropen2 to "1". This flag Xegropen2 is set to "1" when the EGR valve 18 was subjected to failure check in a range where the target opening degree Tegr of the EGR valve 18 is equal to or larger than the predetermined value α.

In Step 420 subsequent to Step 400 or 410, the ECU 50 determines whether or not both the small opening degree check flag Xegropen1 and the large opening degree check flag Xegropen2 are "1". If YES in Step 420, it represents that the EGR valve 18 was subjected to check in both the region where the target opening degree Tegr is smaller than the predetermined value α and the region where the target opening degree Tegr is equal to or larger than the predetermined value α. Thus, the ECU 50 shifts the processing to Step 430. If NO in Step 420, it represents that the EGR valve 18 was not subjected to check in both the above regions of the target opening degree Tegr. Thus, the ECU 50 shifts the processing to Step 460.

In Step 430, the ECU 50 determines the EGR valve 18 to be normal. At that time, the ECU 50 can store the fact of the normality determination in a memory.

In Step 440, the ECU 50 respectively resets the small opening degree check flag Xegropen1 and the large opening degree check flag Xegropen2 to "0". In Step 450, the ECU 50 sets the failure determination flag Xegrobd to "1" and terminates subsequent processings.

In Step 460, on the other hand, the ECU 50 suspends failure determination of the EGR valve 18 and terminates subsequent processings.

In Step 470 subsequent to Step 370, the ECU 50 determines whether or not the ratio of the actual measured intake amount Ga to the estimated intake amount kGao during valve opening is equal to "1±E". Herein, the term "E" is a predetermined value less than 1 to define a margin of error. If YES, in Step 470, the estimated intake amount kGao during valve opening is considered to be nearly equal to the actual measured intake amount Ga, the ECU 50 shifts the processing to Step 480. If NO in Step 470, the ECU 50 shifts the processing to Step 500.

In Step 480, the ECU 50 determines whether or not the ratio of the estimated intake amount kGac during valve closing to the actual measured intake amount Ga is not equal to "1±F". Herein, the term "F" is a predetermined value less than 1 to define a margin of error. If YES in Step 480, the estimated intake amount kGac during valve closing is not nearly equal to the actual measured intake amount Ga and thus the ECU 50 advances the processing to Step 490. If NO in Step 480, the estimated intake amount kGac during valve closing is considered to be nearly equal to the actual measured intake amount Ga and thus the ECU 50 shifts the processing to Step 460.

In Step 490, the ECU 50 determines that the EGR valve 18 is failed in the valve open state. At that time, the ECU 50 can notify a driver of the fact of the open-valve failure determination and store this fact in a memory.

In Step 510, the ECU 50 sets the failure determination flag Xegrobd to "1" and terminates subsequent processings.

In Step 500, on the other hand, the ECU 50 determines that the EGR valve 18 is failed in the valve-closed state. At that time, the ECU 50 can notify a driver of the fact of the closed-valve failure determination and store this fact in a memory. Subsequently, the ECU 50 shifts the processing to Step 510 and terminates subsequent processings.

According to the above control, different from the third embodiment, the ECU 50 determines if the EGR valve 18 is failed respectively under a first condition that the target opening degree Tegr of the EGR valve 18 is equal to or larger than the predetermined value α, that is, the EGR valve 18 is open at a predetermined opening degree or more, and a second condition that the target opening degree Tegr is less than the predetermined value α, that is, the EGR valve 18 is open at less than the predetermined opening degree. When the EGR valve 18 is determined to be normal under both the first and second conditions, the ECU 50 determines that the EGR valve 18 is normal.

In the above control, different from the third embodiment, a region in which a suitable EGR rate is 20% or more is assumed. For determination of a failure of the EGR valve 18, therefore, the ratio values "Ga/kGao" and "kGac/Ga" are adopted.

The failure detection device of the above explained embodiment provides the following operations and effects especially different from those in the third embodiment. Specifically, under the first condition that the EGR valve 18 is open at the predetermined opening degree or more (under the condition that the target opening degree Tegr is the predetermined value α or higher) and the second condition that the EGR valve 18 is open at less than the predetermined opening degree (under the condition that the target opening degree Tegr is less than the predetermined value α), the ECU 50 determines if the EGR valve 18 is failed. When the EGR valve 18 is determined to be normal under the first and second conditions, the ECU 50 determines the EGR valve 18 to be normal. Accordingly, the reliability of normality determination on the EGR valve 18 is enhanced. This enables more correct confirmation that the EGR valve 18 is normal.

According to the present embodiment, when the EGR valve 18 is determined to be failed, the ECU 50 finds both the estimated intake amount kGac during valve closing of the EGR valve 18 and the estimated intake amount kGao during valve opening of the EGR valve 18 based on the engine rotation speed NE and the throttle opening degree TA and also finds the actual measured value of the intake amount Ga. By comparing those estimated intake amount kGac and intake amount Ga and comparing those estimated intake amount kGao and intake amount Ga, the ECU 50 further determines whether the EGR valve 18 is in the open-valve failure or the closed-valve failure. This can further specify whether the EGR valve 18 is in the open-valve failure or the closed-valve failure.

<Fifth Embodiment>

A fifth embodiment embodying a failure detection device for an exhaust recirculation apparatus of a supercharger-equipped engine according to the present invention will be explained in detail referring to accompanying drawings.

Figure 9:
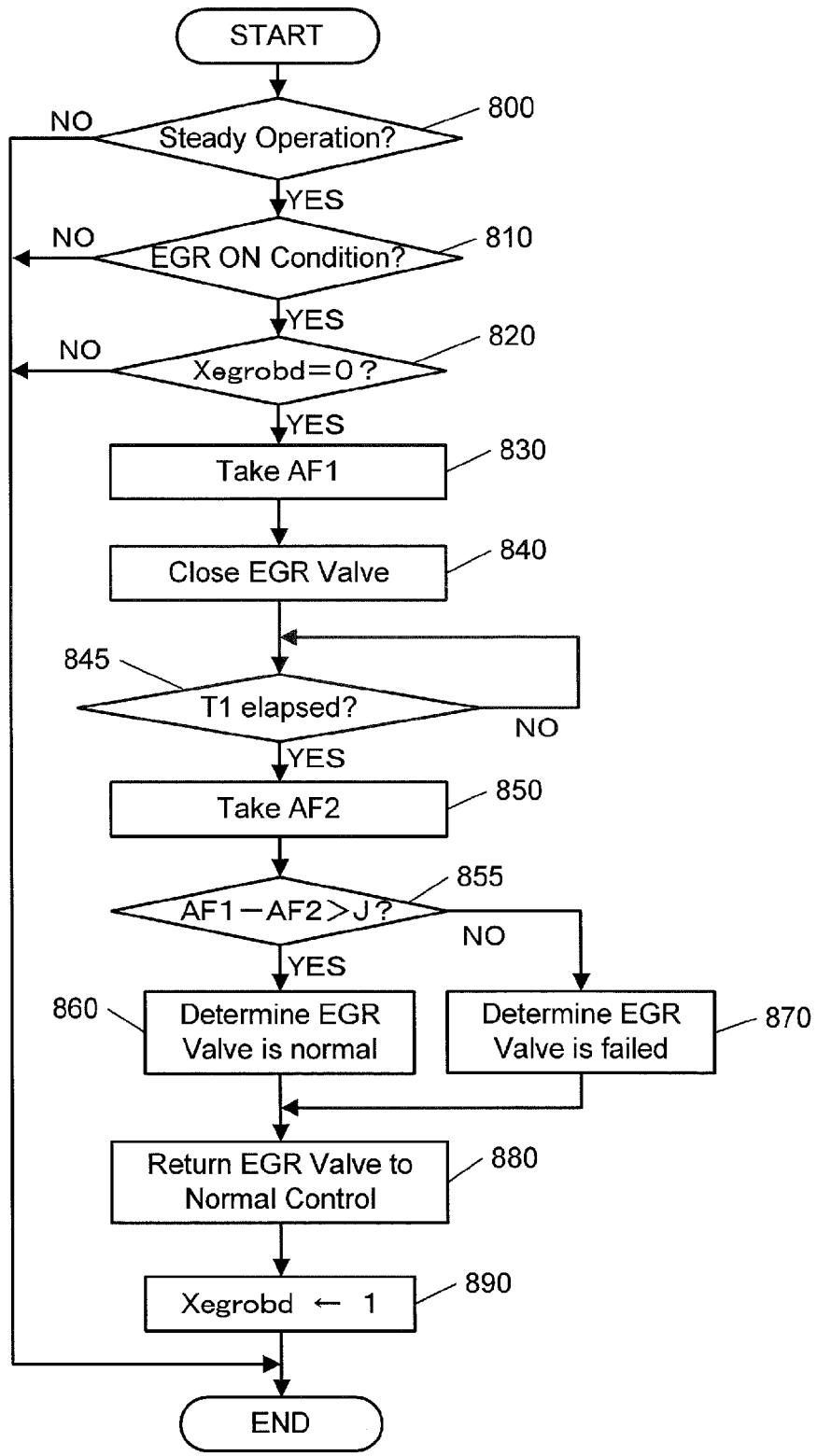
FIG. 9 is a flowchart showing one example of processing details to detect a failure in a EGR valve in a fifth embodiment.

The fifth embodiment differs from each of the above embodiments in the processing details for failure detection. FIG. 9 is a flowchart showing one example of the processing details to detect a failure of the EGR valve 18 in the present embodiment.

When the processing proceeds to this routine, in Step 800, the ECU determines whether or not the operating condition of the engine 1 is a steady operating condition (including the case where a vehicle is in a steady running state). If NO in Step 800, the ECU 50 immediately terminates the processing. If YES in Step 800, the ECU 50 shifts the processing to Step 810.

In Step 810, the ECU 50 determines whether or not the EGR ON condition is established. If NO in Step 810, the ECU 50 immediately terminates the processing. If YES in Step 810, the ECU 50 shifts the processing to Step 820.

In Step 820, the ECU 50 determines whether or not the failure determination flag Xegrobd is "0". If No in Step 820, the ECU 50 immediately terminates the processing. If YES in Step 820, the ECU 50 shifts the processing to Step 830.

In Step 830, the ECU 50 takes a first air-fuel ratio AF (AF1) based a detection value of the air-fuel ratio sensor 55.

In Step 840, the ECU 50 controls the EGR valve 18 to close. Specifically, the ECU 50 forcibly closes the EGR valve 18 remaining open under the EGR ON condition.

In Step 845, the ECU 50 then waits for a lapse of predetermined time T1 from closing of the EGR valve 18, and shifts the processing to Step 850. In Step 850, the ECU 50 takes a second air-fuel ratio AF (AF2) based on a detection value of the air-fuel ratio sensor 55.

In Step 855, the ECU 50 determines whether or not a difference between the first air-fuel ratio AF1 and the second air-fuel ratio AF2 is larger than a predetermined value J. In other words, the ECU 50 determines whether or not the air-fuel ratio AF deviates to a rich side immediately after the EGR valve 18 is closed.

Figure 10:
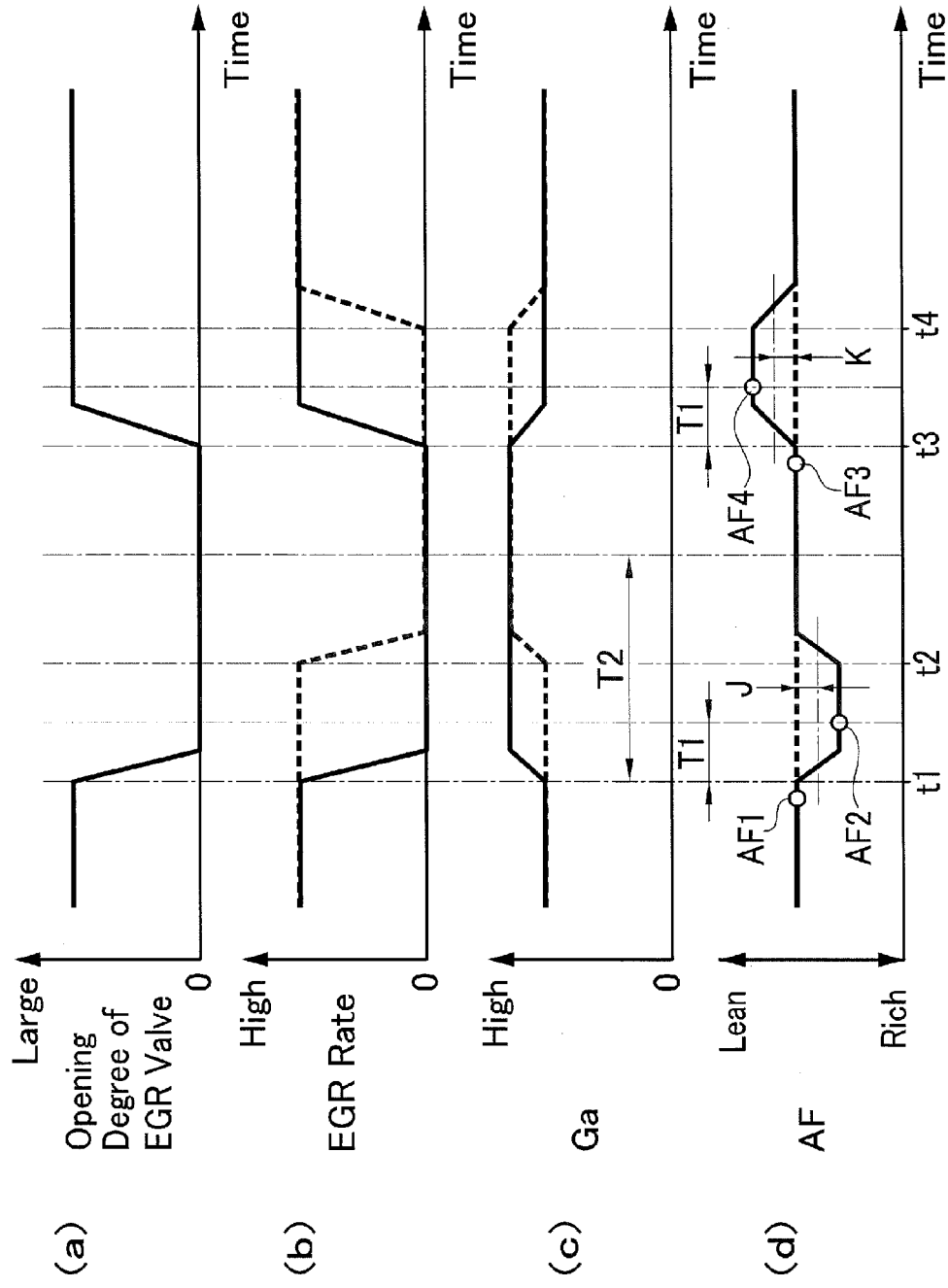
FIG. 10 is a time chart showing behaviors of (a) opening degree of the EGR valve, (b) EGR rate, (c) intake amount, and (d) air-fuel ratio when the EGR valve is normal in the fifth embodiment.

Herein, FIG. 10 shows a time chart showing behaviors of (a) opening degree of the EGR valve 18, (b) EGR rate, (c) intake amount Ga, and (d) air-fuel ratio AF in the case where the EGR valve 18 is normal. In FIG. 10, at time t1, when the EGR valve 18 is closed from the valve open state as shown in (a), the EGR rate at the outlet 17a of the EGR passage 17 rapidly decreases as indicated by a thick line in (b), the intake amount Ga measured by the air flow meter 54 increases as indicated by a thick line in (c), and the air-fuel ratio AF deviates to a rich side as indicated in (d). Then, at slightly later time t2 in FIG. 10, the EGR rate in the combustion chamber 16 rapidly decreases as indicated by a broken line in (b), the intake amount Ga in the combustion chamber 16 increases as indicated by a broken line in (c) and the air-fuel ratio AF deviated to the rich side returns to an original level as indicated by a thick line in (d). In this manner, since increasing of the intake amount Ga in the combustion chamber 16 gets delayed, the air-fuel ratio AF temporarily deviates to a rich side immediately after the EGR valve 18 is forcibly closed from the valve open state. By checking the deviation of the air-fuel ratio AF to the rich side, it is ascertained that the EGR valve 18 is normally closed from the valve-open state. This rich-side deviation of the air-fuel ratio AF is determined based on that a difference between the first air-fuel ratio AF 1 taken before the time t1 and the second air-fuel ratio AF2 taken after a lapse of the predetermined time T1 from when the time t1 is larger than the predetermined value J as shown in FIG. 10 (d).

Returning to FIG. 9, if YES in Step 855, the ECU 50 determines in Step 860 that the EGR valve 18 is normal. At that time, the ECU 50 can store the fact of the normality determination in a memory.

On the other hand, if NO in 855, the ECU 50 determines in Step 870 that the EGR valve 18 is failed. At that time, the ECU 50 can notify a driver of the fact of the failure determination or store this fact in a memory.

In Step 880 subsequent to Step 860 or 870, subsequently, the ECU 50 returns the EGR valve 18 to normal control. In other words, the ECU 50 returns the EGR valve 18 from the forcibly valve-closed state to the previous valve-open state.

In Step 890, the ECU 50 sets the failure determination flag Xegrobd to "1" and then terminates the processing.

According to the above control, different from the third and fourth embodiments, the ECU 50 forcibly opens and closes the EGR valve 18 during steady operation of the engine 1 and determines whether or not the EGR valve 18 is failed based on changes in air-fuel ratio AF detected by the air-fuel ratio sensor 55. To be concrete, immediately after forcibly closing the EGR valve 18 from the valve-open state, the ECU 50 determines whether or not the air-fuel ratio AF deviates to a rich side. The ECU 50 judges that the EGR valve 18 is normal when the rich-side deviation is present, whereas the ECU 50 judges that the EGR valve 18 is failed when the rich-side deviation is absent.

According to the failure detection device of the present embodiment explained above, during steady operation of the engine 1, the ECU 50 forcibly closes the EGR valve 18 and determines the presence/absence of changes in air-fuel ratio AF detected by the air-fuel ratio sensor 55, thereby determining the presence/absence of a failure of the EGR valve 18. Herein, the air-fuel ratio sensor 55 is used to detect the air-fuel ratio AF representing the operating condition of the engine 1 and thus no additional unit or means to detect a failure of the EGR valve 18 is needed. Accordingly, during steady operation of the engine 1, it is possible to effectively detect the failure of the EGR valve 18 without providing any additional unit or means for failure detection in the low pressure loop exhaust recirculation apparatus.

<Sixth Embodiment>

A sixth embodiment embodying a failure detection device for an exhaust recirculation apparatus of a supercharger-equipped engine according to the present invention will be explained in detail referring to accompanying drawings.

Figure 11:
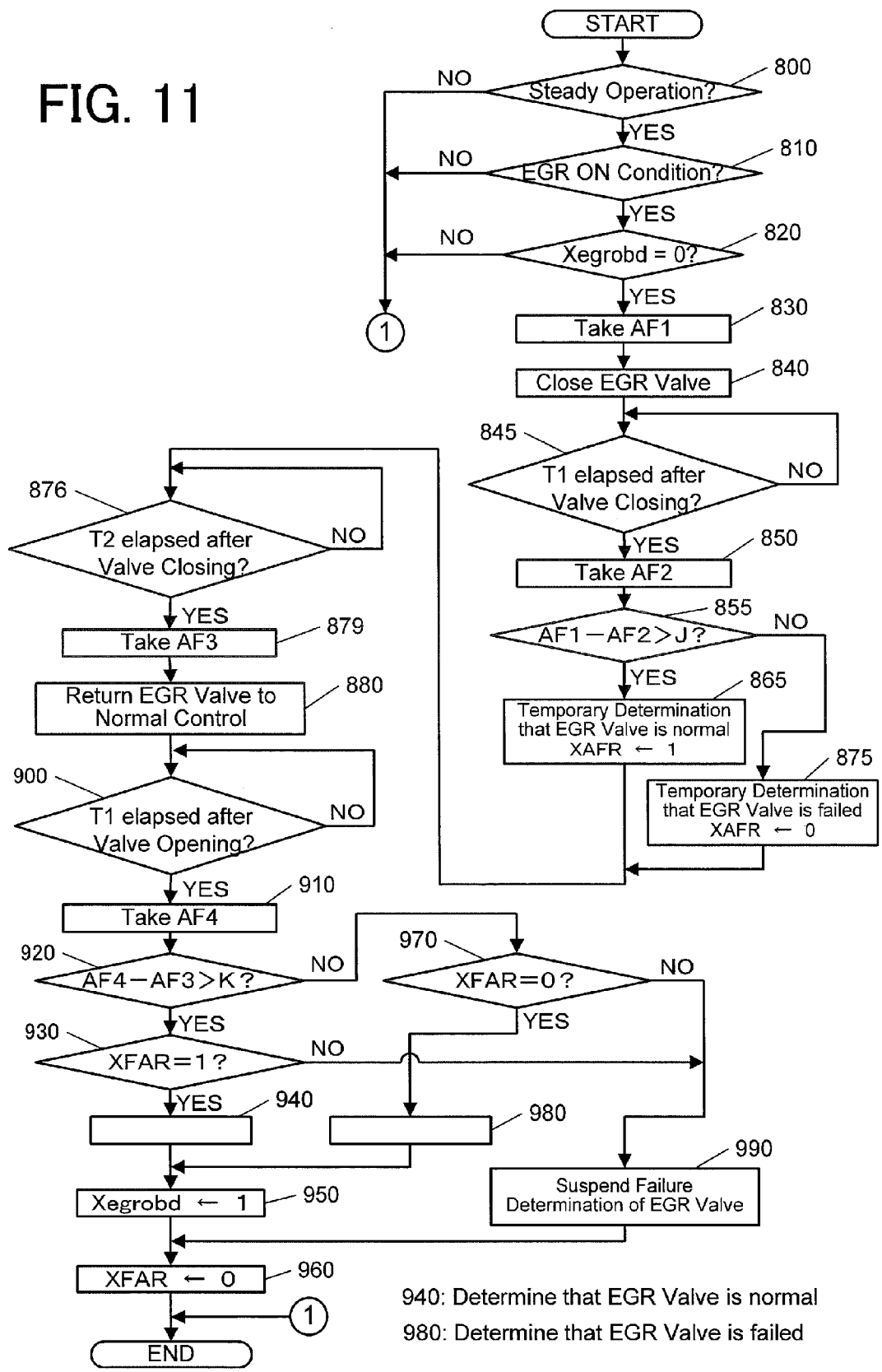
FIG. 11 is a flowchart showing one example of processing details to detect a failure in a EGR valve in a sixth embodiment.

The sixth embodiment differs from each of the above embodiments in the processing details for failure detection. FIG. 11 is a flowchart showing one example of the processing details to detect a failure of the EGR valve 18 in the present embodiment. The flowchart of FIG. 11 is identical to the flowchart of FIG. 9 in Steps 800 to 855 and 880 and different from the flowchart of FIG. 9 in remaining Steps 865, 875, 876, 879, and 900 to 990.

When the processing proceeds to this routine, the ECU 50 executes the processings in the Steps 800 to 855 in a similar manner to the flowchart of FIG. 9. If YES in Step 855, the ECU 50 shifts the processing to Step 865. If NO in Step 855, the ECU 50 shifts the processing to Step 875.

In Step 865, the ECU 50 temporarily determines that the EGR valve 18 is normal ("normality temporary determination") and sets a normality temporary determination flag XAFR to "1". Herein, the normality temporary determination represents that the EGR valve 18 is temporarily determined to be normal, differently from that the EGR valve 18 is conclusively determined to be normal ("normality conclusive determination") which will be mentioned later.

On the other hand, in Step 875, the ECU 50 temporarily determines that the EGR valve 18 is failed ("failure temporary determination") and sets the normality temporary determination flag XAFR to "0". Herein, the failure temporary determination represents that the EGR valve 18 is temporarily determined to be failed, differently from that the EGR valve 18 is conclusively determined to be failed ("failure conclusive determination") which will be mentioned later.

In Step 876, the ECU 50 waits for a lapse of a predetermined time T2 (>T1) from closing of the EGR valve 18, and then shifts the processing to Step 879. In Step 879, the ECU 50 takes a third air-fuel ratio AF (AF3) based on a detection value of the air-fuel ratio sensor 55.

In Step 880, the ECU 50 then returns the EGR valve 18 to normal control.

Specifically, the ECU 50 returns the EGR valve 18 from the forcibly closed state to the previous open state.

In Step 900, the ECU 50 waits for a lapse of a predetermined time T1 from opening of the EGR valve 18, and then shifts the processing to Step 910. In Step 910, the ECU 50 takes a fourth air-fuel ratio AF (AF4) based on a detection value of the air-fuel ratio sensor 55.

In Step 920, the ECU 50 determines whether or not a difference between the fourth air-fuel ratio AF4 and the third air-fuel ratio AF3 is larger than a predetermined value K. Specifically, the ECU 50 determines whether or not the air-fuel ratio AF deviates to a lean side immediately after the EGR valve 18 is opened.

Herein, at time t3 in FIG. 10, when the EGR valve 18 is opened from the valve-closed state to the previous open state as shown in (a), the EGR rate at the outlet 17a of the EGR passage 17 rises as indicated by the thick line in (b), the intake amount Ga measured by the air flow meter 54 decreases as indicated by the thick line in (c), and the air-fuel ratio AF temporarily deviates to a lean side as indicated by the thick line in (d). Thereafter, at slightly later time t4 in FIG. 10, the EGR rate in the combustion chamber 16 rapidly increases as indicated by the broken line in (b), the intake amount Ga of the combustion chamber 16 decreases as indicated by the broken line in (c), and the air-fuel ratio AF deviated to the lean side returns to an original level as indicated by the thick line in (d). In this manner, since decreasing of the intake amount Ga in the combustion chamber 16 gets delayed, the air-fuel ratio AF temporarily deviates to a lean side immediately after the EGR valve 18 is opened from the valve-closed state to the previous valve-open state. By checking the deviation of the air-fuel ratio AF to the lean side, it is ascertained that the EGR valve 18 is normally opened from the valve-closed state. This lean-side deviation of the air-fuel ratio AF is determined based on that a difference between the fourth air-fuel ratio AF4 taken after a lapse of the predetermined time T1 from the time t3 and the third air-fuel ratio AF3 taken before the time t3 is larger than the predetermined value K as shown in FIG. 10 (d).

Returning to FIG. 11, if YES in Step 920, the ECU 50 determines in Step 930 whether or not the normality temporary determination flag XAFR is "1". If YES in Step 930, the ECU 50 shifts the processing to Step 940. If NO in Step 930, the ECU 50 shifts the processing to Step 990.

In Step 940, the ECU 50 conclusively determines that the EGR valve 18 is normal. At that time, the ECU 50 can store the fact the normality conclusive determination in a memory.

If NO in Step 920, on the other hand, the ECU 50 determines in Step 970 whether or not the normality temporary determination flag XAFR is "0". If YES in Step 970, the ECU 50 shifts the processing to Step 980. If NO in Step 970, the ECU 50 shifts the processing to Step 990.

In Step 980, the ECU 50 conclusively determines that the EGR valve 18 is failed. At that time, the ECU 50 can notify a driver of the fact of the failure determination or store this fact in a memory.

In Step 950 subsequent to Step 940 or 980, the ECU 50 sets the failure determination flag Xegrobd to "1". In Step 960, the ECU 50 then resets the normality temporary determination flag XFAR to "0" and terminates subsequent processings.

On the other hand, in Step 990 subsequent to Step 930 or 970, the ECU 50 suspends the failure determination of the EGR valve 18 and advances the processing to Step 960.

According to the above control, different from the fifth embodiment, the ECU 50 forcibly closes the EGR valve 18 from the valve-open state and then immediately determines whether or not the air-fuel ratio AF deviates to a rich side. The ECU 50 thus temporarily determines the normality when the rich-side deviation of the air-fuel ratio AF is present, while temporarily determines the failure when the rich-side deviation is absent. Subsequently, the ECU 50 forcibly opens the EGR valve 18 from the valve-closed state and then immediately determines whether or not the air-fuel ratio AF deviates to a lean side. When the normality is temporarily determined and the lean-side deviation is present, the ECU 50 conclusively determines the EGR valve 18 to be normal. When the failure is temporarily determined and the lean-side deviation is absent, the ECU 50 conclusively determines the EGR valve 18 to be failed.

The failure detection device of the present embodiment explained above provides the following operations and effects different from those in the fifth embodiment. Specifically, in the presence of the rich-side deviation of the air-fuel ratio AF, the EGR valve 18 is temporarily determined to be normal. In the absence of the rich-side deviation of the air-fuel ratio AF, the EGR valve 18 is temporarily determined to be failed. When the normality is temporarily determined and the air-fuel ratio AF deviates to the lean side, the EGR valve 18 is conclusively determined to be normal. When the failure is temporarily determined and the air-fuel ratio AF does not deviate to the lean side, the EGR valve 18 is conclusively determined to be failed. This makes it possible to more accurately detect the EGR valve 18 to be failed or to be normal.

<Seventh Embodiment>

A seventh embodiment embodying a failure detection device for an exhaust recirculation apparatus of a supercharger-equipped engine according to the present invention will be explained referring to accompanying drawings.

Figure 12:
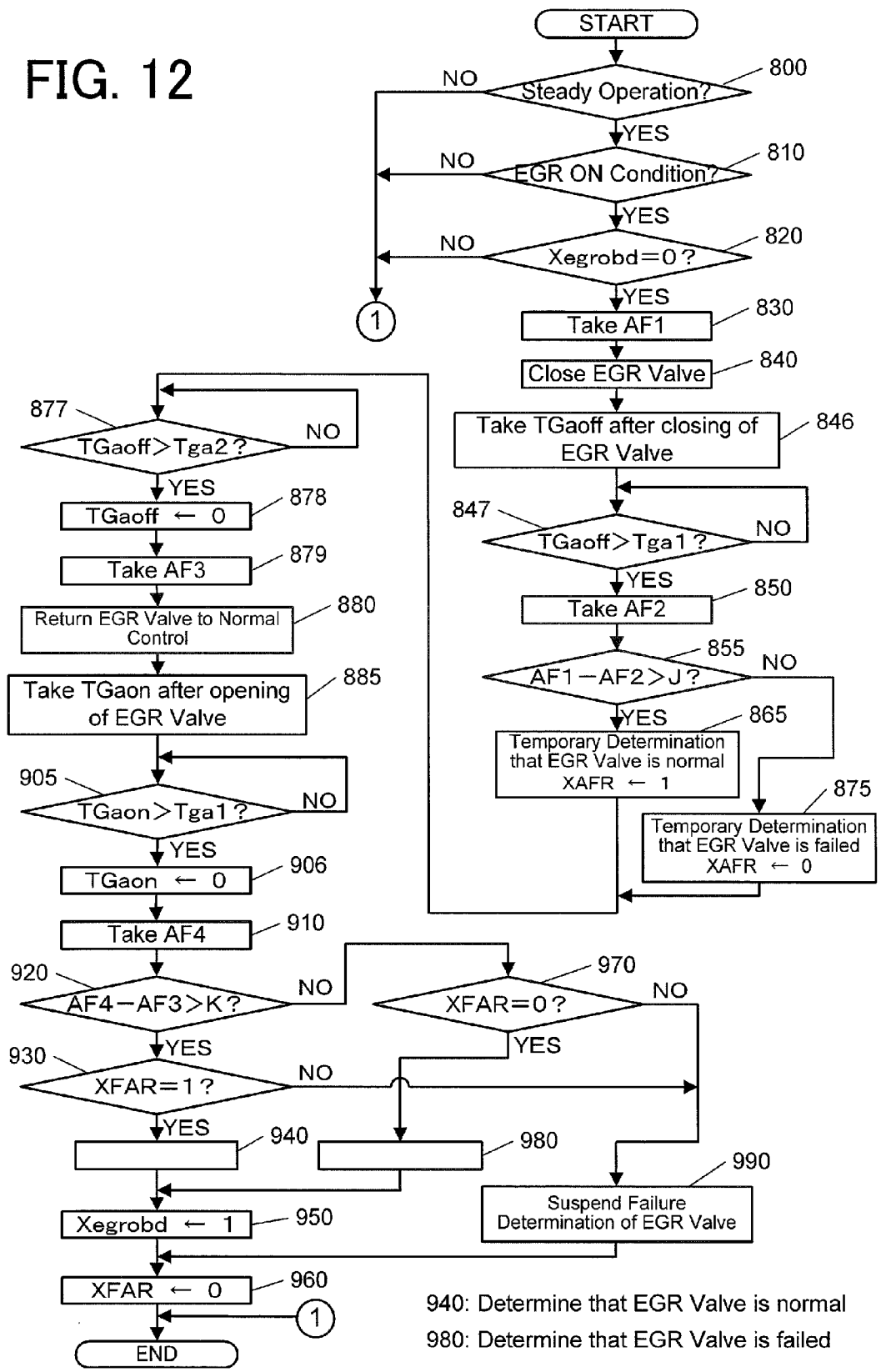
FIG. 12 is a flowchart showing one example of processing details to detect a failure in a EGR valve in a seventh embodiment.

The seventh embodiment differs from the sixth embodiment in the processing details for failure detection. FIG. 12 is a flowchart showing one example of the processing details to detect a failure of the EGR valve 18 in the present embodiment. The flowchart of FIG. 12 is different from the flowchart of FIG. 11 in Steps 846 and 847 provided instead of the processing in Step 845 in the flowchart of FIG. 11, and Steps 877 and 878 instead of the processing in Step 876 in the flowchart of the FIG. 11, and Steps 885, 905, and 906 instead of the processing in Step 900 in the flowchart of FIG. 11.

When the processing proceeds to this routine, the ECU 50 executes the processings in Steps 800 to 840 in a similar manner to those in the flowchart of FIG. 11. In Step 846, the ECU 50 takes an accumulated intake amount TGaoff after the EGR valve 18 is closed. The ECU 50 can find this accumulated intake amount TGaoff after valve closing by sequentially accumulating intake amounts Ga obtained after closing the EGR valve 18. In Step 847, the ECU 50 waits for the accumulated intake amount TGaoff after valve closing becomes larger than a predetermined value Tga1, and shifts the processing to Step 850.

Thereafter, the ECU 50 executes the processings in Steps 850 to 875 and, in Step 877, waits for the accumulated intake amount TGaoff after valve closing becomes larger than a predetermined value Tga2, and then shift the processing to Step 878. In Step 878, the ECU 50 resets the accumulated intake amount TGaoff after valve closing to "0".

Subsequently, the ECU 50 executes the processing in the Steps 879 and 880 and then in Step 885 takes an accumulated intake amount TGaon after the EGR valve 18 is opened. The ECU 50 can find this accumulated intake amount TGaon after valve opening by sequentially accumulating the intake amounts Ga obtained after opening the EGR valve 18 in Step 880. In Step 905, the ECU 50 waits for that the accumulated intake amount TGaon after valve opening becomes larger than the predetermined value Tga1 and then shifts the processing to Step 906. In Step 906, the ECU 50 resets the accumulated intake amount TGaon after valve opening to "0". Subsequently, the ECU 50 executes the processings in Steps 910 to 990.

Figure 13:
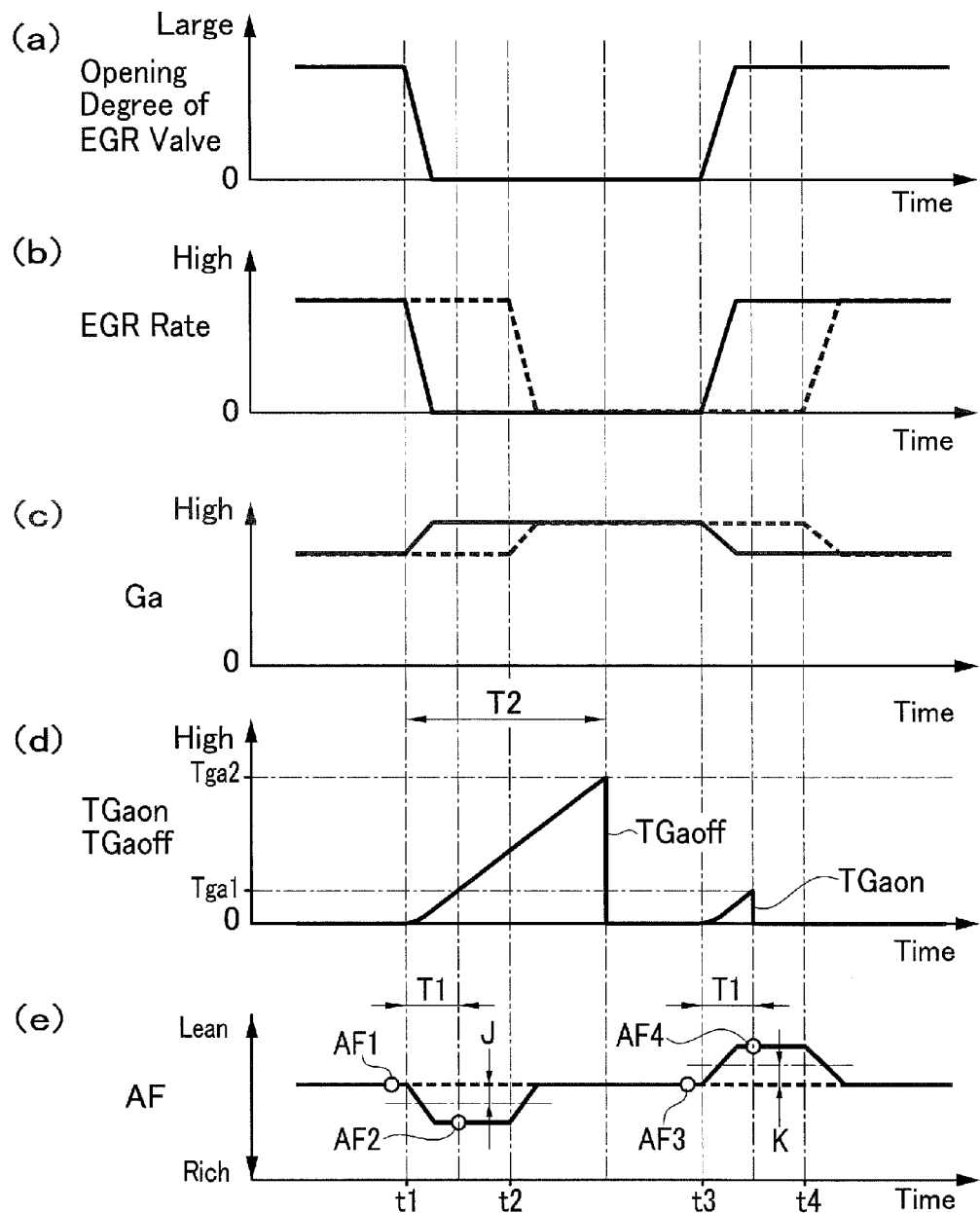
FIG. 13 is a time chart showing behaviors of (a) opening degree of the EGR valve, (b) EGR rate, (c) intake amount, (d) accumulated intake amounts after valve closing and after valve opening of the EGR valve, and (e) air-fuel ratio when the EGR valve is normal in the seventh embodiment.

FIG. 13 is a time chart showing behaviors of (a) opening degree of the EGR valve 18, (b) EGR rate, (c) intake amount Ga, (d) accumulated intake amount TGaoff after valve closing and accumulated intake amount TGaon after valve opening of the EGR valve 18, and (e) air-fuel ratio AF in the case of the EGR valve 18 being normal. Regarding the timing to take the air-fuel ratios AF2 and AF3 after closing the EGR valve 18 and take the air-fuel ratio AF4 after opening the EGR valve 18, the ECU 50 in the sixth embodiment determines respective timings at the time when the predetermined time T1 or T2 has elapsed as shown in FIG. 10. According to the above control in the present embodiment, it is determined at the time when the accumulated intake amount TGaoff after valve closing and the accumulated intake amount TGaon after valve opening exceed the predetermined values Tga1 and Tga2 respectively as shown in FIG. 13. The present embodiment can therefore also provide similar operations and effects to those in the sixth embodiment.

<Eighth Embodiment>

An eighth embodiment embodying a failure detection device for an exhaust recirculation apparatus of a supercharger-equipped engine according to the present invention will be explained in detail referring to accompanying drawings.

Figure 14:
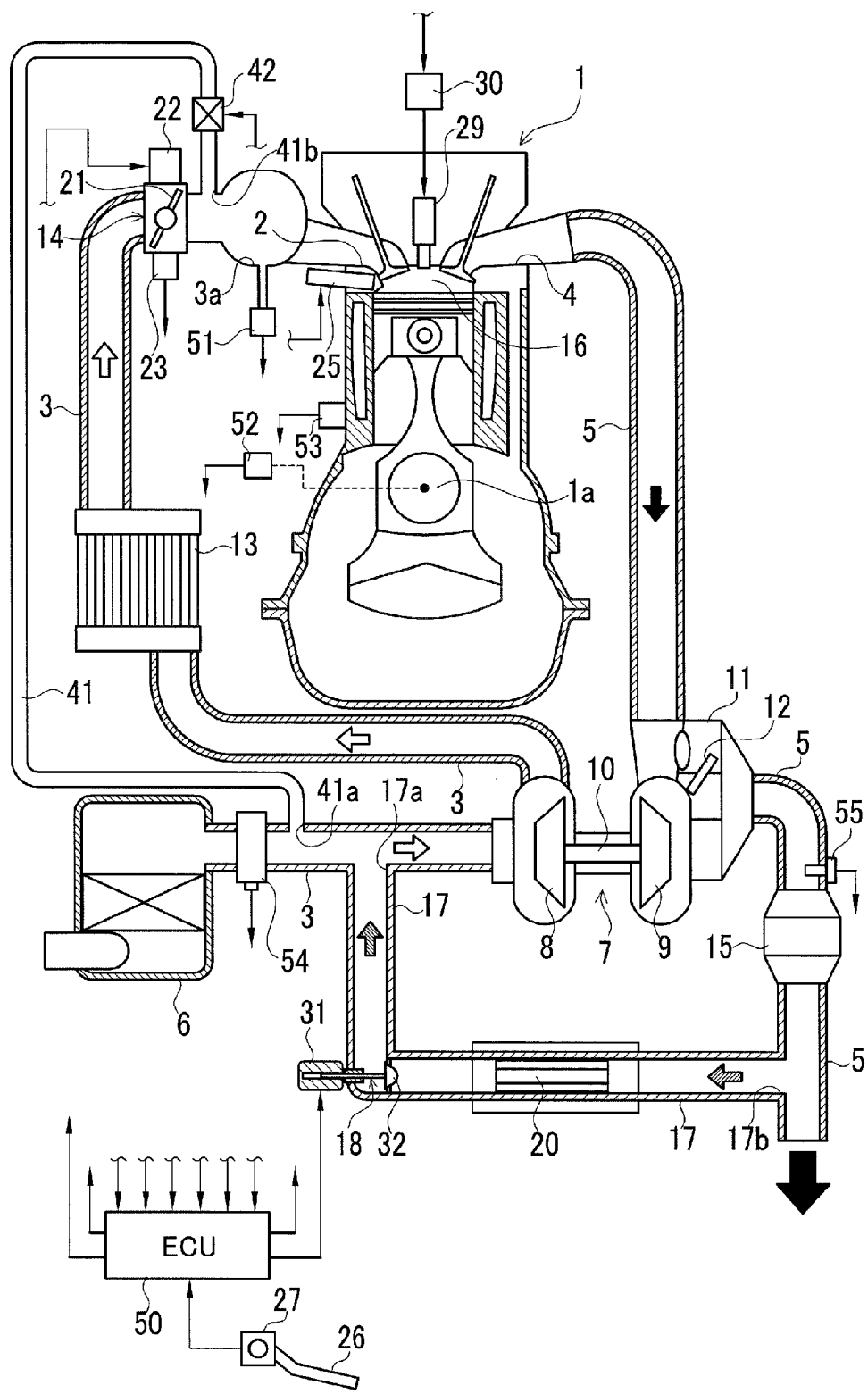
FIG. 14 is a schematic configuration view showing an engine system including an EGR apparatus of an engine with a supercharger in an eighth embodiment.

The eighth embodiment differs from each of the above embodiments in the configuration of an engine system and the processing details for failure detection. FIG. 14 is a schematic configuration view of the engine system including an EGR apparatus of a supercharger-equipped engine in the present embodiment. The engine system in the present embodiment differs from that shown in FIG. 1 in a fresh-air induction passage 41 and a fresh-air induction valve 42 which are additionally provided. The fresh-air induction passage 41 has an inlet 41a connected to the intake passage 3 upstream of the outlet 17a of the EGR passage 17 and an outlet 41b connected to the intake passage 3 downstream of the throttle valve 21 and upstream of the surge tank 3a. The fresh-air induction valve 42 is an electrically operated valve provided in the fresh-air induction passage 41 and is controlled to regulate a flow rate of fresh air in the passage 41.

Figure 15:
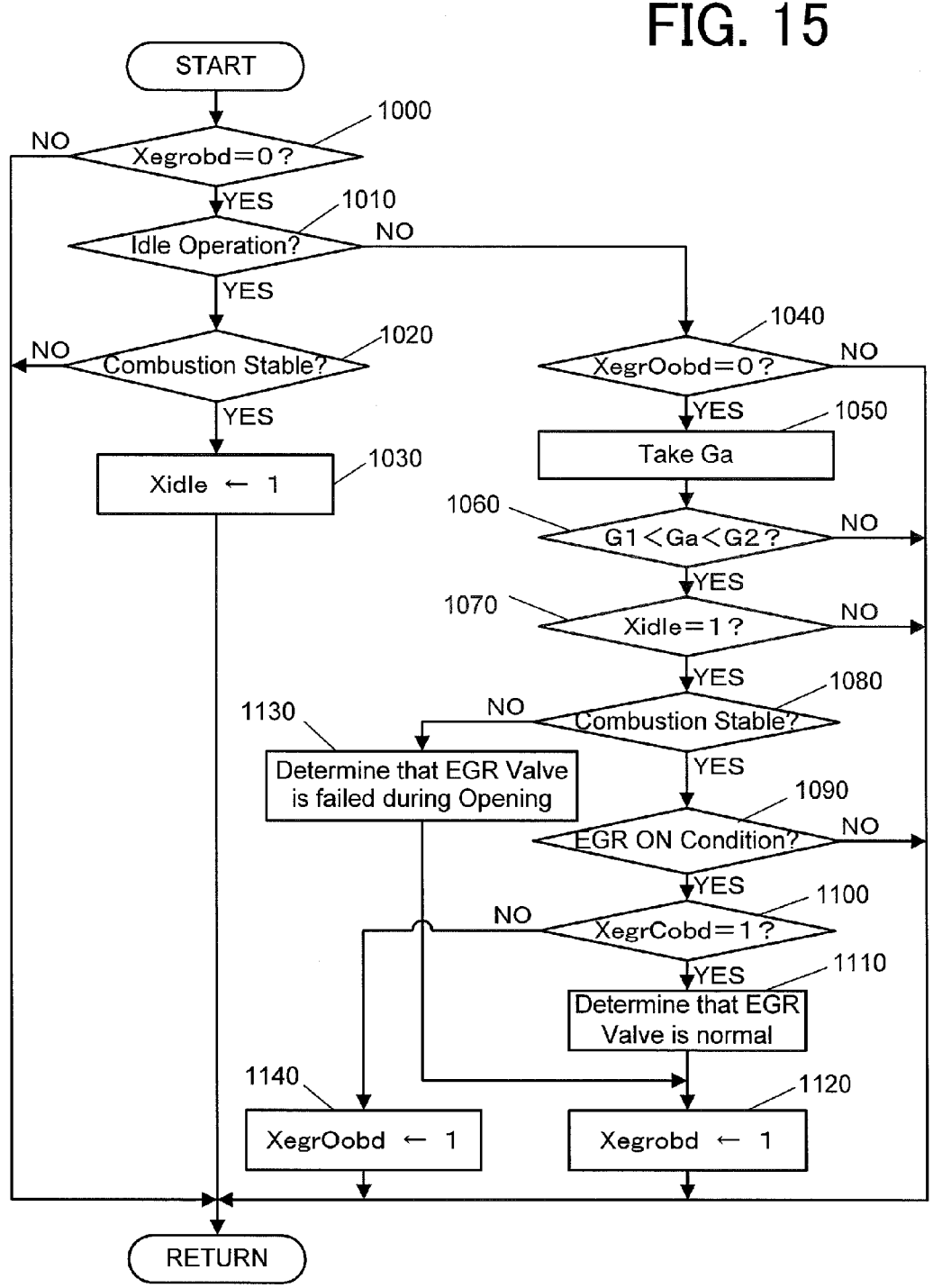
FIG. 15 is a flowchart showing one example of processing details to detect a failure in an EGR valve in the eighth embodiment.
Figure 16:
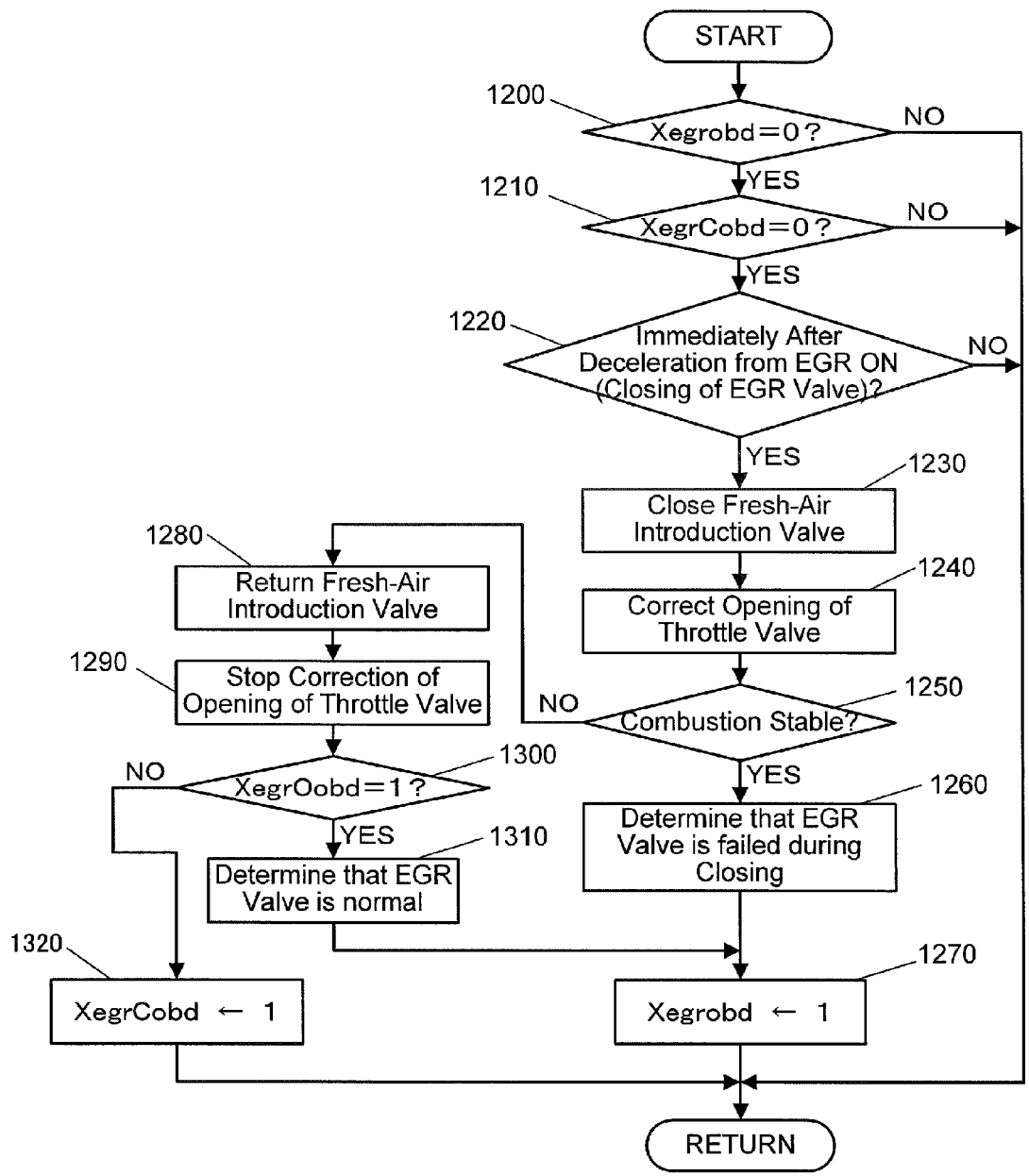
FIG. 16 is a flowchart showing one example of processing details to detect a failure in a EGR valve in the eighth embodiment.

FIGS. 15 and 16 are flowcharts respectively showing one examples of the processing details to detect a failure of the EGR valve 18 in the present embodiment. When the processing proceeds to this routine in FIG. 15, the ECU 50 determines in Step 1000 whether or not a failure determination flag Xegrobd is "0". If NO in Step 1000, the ECU 50 returns the processing again to Step 1000. If YES in Step 1000, the ECU 50 advances to the processing to Step 1010.

In Step 1010, the ECU 50 determines whether or not the engine 1 is at idle. The ECU 50 can make this determination based on an engine rotation speed NE and a throttle opening degree TA and others. During idle operation of the engine 1, the EGR valve 18 is controlled to close. If YES in Step 1010, the ECU 50 shifts the processing to Step 1020. If NO in Step 1010, the ECU 50 advances the processing to Step 1040.

In Step 1020, the ECU 50 determines whether or not combustion is stable. Specifically, the ECU 50 determines whether or not the combustion of air-fuel mixture in the combustion chamber 16 is stable. The ECU 50 makes this determination based on changes in combustion state. Herein, the changes in combustion state reflects in the rotation speed of the engine 1. In other words, when the combustion state is stable, the engine rotation speed NE, that is, the rotation angle of a crank shaft 1a exhibits stable cyclic changes. In contrast, when the combustion is unstable, the rotation angle of the crank shaft 1a exhibits unstable cyclic changes. Accordingly, the ECU 50 can make this determination based on the engine rotation speed NE detected by the rotation speed sensor 52. If NO in Step 1020, the ECU returns the processing to Step 1000. If YES in Step 1020, the ECU 50 advances the processing to Step 1030. Herein, during idle operation of the engine 1, EGR gas (EGR rate) is less taken in the combustion chamber 16 even when the EGR valve 18 remaining open is failed. Thus, the combustion of air-fuel mixture does not get unstable due to the influence of EGR gas. This makes it difficult to determine open-valve failure of the EGR valve 18 based on the changes in combustion state of air-fuel mixture. However, from the stable combustion of air-fuel mixture during idle operation, it is ascertained that fuel supply by the injectors 25 and others (a fuel supply device) and ignition operation by the ignition plugs 29 and others (an ignition device) are normal.

In Step 1030, the ECU 50 sets an idle stability flag Xidle to "1" and returns the processing to Step 1000. Herein, the idle stability flag Xidle is set to "1" in a case where the combustion is stable and set to "0" in a case where the combustion is unstable.

On the other hand, in Step 1040 subsequent to Step 1010, the ECU 50 determines whether or not a largely open-valve non-failure determination flag XegrOobd is "0". Herein, this largely open-valve non-failure determination flag XegrOobd is set to "1" when it is completely determined that the EGR valve 18 is held largely open and is not failed, while the flag XegrOobd is set to "0" when this determination is not completed. If NO in Step 1040, the ECU 50 returns the processing to Step 1000. If YES in Step 1040, the ECU 50 shifts the processing to Step 1050.

In Step 1050, the ECU 50 takes an intake amount Ga. In Step 1060, the ECU 50 determines whether or not the taken intake amount Ga is larger than a predetermined value G1 and smaller than a predetermined value G2(G1<G2). If NO in Step 1060, the ECU 50 returns the processing to Step 1000. If YES in Step 1060, the ECU 50 considers that the intake amount Ga is in a moderate range and the exhaust pressure of the engine 1 is in a rising range, and shifts the processing to Step 1070.

In Step 1070, the ECU 50 determines whether or not the idle stability flag Xidle to "1". If NO in Step 1070, the ECU 50 returns the processing to Step 1000. If YES in Step 1070, the ECU 50 shifts the processing to Step 1080.

In Step 1080, in a similar manner to the above, the ECU 50 determines whether or not the combustion of air-fuel mixture is stable. At that time, since the determination result in Step 1070 is affirmative, it is ascertained that combustion has been stable during idle operation, that is, the fuel supply device and the ignition device are normal. Thus, the combustion being unstable in Step 1080 represents that EGR gas is accidentally taken in the combustion chamber 16, resulting in a high EGR rate, that is, the EGR valve 18 is failed in an open state. If NO in Step 1080, the ECU 50 shifts the processing to Step 1130. If YES in Step 1080, the ECU 50 advances the processing to Step 1090.

In Step 1130, because of the unstable combustion, the ECU 50 determines that the EGR valve 18 is failed in an open state. At that time, the ECU 50 can notify a driver of the fact of the open-valve failure determination or store this fact in a memory.

On the other hand, in Step 1090, the ECU 50 determines whether or not the EGR ON condition is established. If NO in Step 1090, the ECU 50 returns the processing to Step 1000. If YES in Step 1090, the ECU 50 shifts the processing to Step 1100.

In Step 1100, the ECU 50 determines whether or not a closed-valve non-failure determination flag XegrCobd is "1". Herein, this flag XegrCobd is set to "1" when it is completely determined that the EGR valve 18 held in a valve-closed state is not failed and set to "0" when this determination is not completed. If NO in Step 1100, the ECU 50 shifts the processing to Step 1140. If YES in Step 1100, the ECU 50 advances the processing to Step 1110.

In Step 1140, the ECU 50 sets the largely open-valve non-failure determination flag XegrOobd to "1" and returns the processing to Step 1000.

In Step 1110, on the other hand, the ECU 50 determines that the EGR valve 18 is normal. At that time, the ECU 50 can store the fact of the normality determination in the memory.

In Step 1120 subsequent to Step 1130 or 1110, the ECU 50 sets the failure determination flag Xegrobd to "1" and returns the processing to Step 1000.

Next, the flowchart of FIG. 16 will be explained. When the processing proceeds to this routine, the ECU 50 determines in Step 1200 whether or not the failure determination flag Xegrobd is "0". If NO in Step 1200, the ECU 50 returns the processing to Step 1200. If YES in Step 1200, the ECU 50 advances the processing to Step 1210.

In Step 1210, the ECU 50 determines whether or not the closed-valve non-failure determination flag XegrCobd is "0". If NO in Step 1210, the ECU 50 returns the processing to Step 1200. If YES in Step 1210, the ECU 50 shifts the processing to Step 1220.

In Step 1220, the ECU 50 determines whether or not the engine is in a state immediately after deceleration from EGR ON or whether or not it is the EGR valve 18 is in a state immediately after it is closed. If NO in Step 1220, the ECU 50 returns the processing to Step 1200. If YES in Step 1220, the ECU 50 shifts the processing to Step 1230.

In Step 1230, the ECU 50 controls the fresh-air induction valve 42 to close. That is, the ECU 50 forcibly closes the fresh-air induction valve 42 from a valve-open state. This blocks the introduction of fresh air to the surge tank 3*a* through the fresh-air induction passage 41.

In Step 1240, the ECU 50 then corrects the valve opening of the throttle valve 21. Herein, when the fresh-air induction valve 42 is closed, the intake amount to be introduced in the combustion chamber 16 decreases. The ECU 50 therefore controls the electronic throttle device 14 to supplement an amount corresponding to such a decrease in intake amount to open the throttle valve 21 by a necessary degree.

In Step 1250, the ECU 50 determines whether or not the combustion is stable. Herein, in the case of the EGR valve 18 being normal, at the time immediately after engine deceleration from EGR ON (immediately after closing of the EGR valve 18), EGR gas supplied until just before is supplied to the combustion chamber 16. Further, the fresh-air induction valve 42 is closed, thereby blocking introduction of fresh air to the combustion chamber 16. Accordingly, a percentage of EGR gas (EGR rate) in the combustion chamber 16 becomes temporarily high, causing unstable combustion of a fuel. In contrast, in the case of the EGR valve 18 failed in a closed state, even when the EGR valve 18 is closed in accordance with the engine deceleration from EGR ON and the fresh-air induction valve 42 is forcibly closed, the EGR rate in the combustion chamber 16 does not change and thus the combustion of a fuel remains stable. The ECU 50 therefore determines whether or not the combustion is stable based on changes in combustion state to determine whether or not the EGR valve 18 is in the closed-valve failure state. If YES in Step 1250, the ECU 50 shifts the processing to Step 1260. If NO in Step 1250, the ECU 50 advances the processing to Step 1280.

In Step 1260, because of stable combustion, the ECU 50 determines that the EGR valve 18 is failed in a closed state. At that time, the ECU 50 can notify a driver of the fact of the closed-valve failure determination or store this fact in the memory.

In Step 1270, thereafter, the ECU 50 sets the failure determination flag Xegrobd to "1" and returns the processing to Step 1200.

On the other hand, in Step 1280, because of unstable combustion, the ECU 50 controls the fresh-air induction valve 42 to return. Specifically, the ECU 50 returns the fresh-air induction valve 42 from the valve-closed state to the valve-open state. This allows re-start of introduction of fresh air to the surge tank 3*a*. In Step 1290, furthermore, the ECU 50 stops correction to open the throttle valve 21.

In Step 1300, the ECU 50 determines whether or not the largely open-valve non-failure determination flag XegrOobd is "1". If NO in Step 1300, the ECU 50 shifts the processing to Step 1320. If YES in Step 1300, the ECU 50 shifts the processing to Step 1310.

In Step 1320, the ECU 50 sets the closed-valve non-failure determination flag XegrCobd to "1" and returns the processing to Step 1200.

In the Step 1310, on the other hand, the ECU 50 judges the EGR valve 18 to be normal. At that time, the ECU 50 can store the fact of the normality determination in the memory. The ECU 50 then shifts the processing to Step 1270.

According to the above control, the ECU 50 determines if the EGR valve 18 is failed based on changes in fuel combustion state of the fuel in the combustion chamber 16 supplied by the injectors 25 while the engine 1 is in a predetermined operating condition. To be specific, the ECU 50 determines the changes in combustion state of the fuel in the combustion chamber 16 during idle operation of the engine 1 based on the engine rotation speed NE detected by the rotation speed sensor 52 and determines the open-valve failure of the EGR valve 18. The ECU 50 causes the fresh-air induction valve 42 to close from the valve-open state immediately after the engine 1 enters the deceleration operation from EGR ON (the EGR valve 18 is closed), and judges the changes in fuel combustion state in the combustion chamber 16 based on the engine rotation speed NE detected by the rotation speed sensor 52 to determine the closed-valve failure of the EGR valve 18.

According to the failure detection device of the present embodiment explained above, similar to the above embodiments, during a predetermined operating condition of the engine 1, the normal EGR valve 18 is controlled, thereby causing changes in a flow of EGR gas flowing from the EGR passage 17 to the intake passage 3, changing the intake amount Ga flowing in the intake passage 3, thus changing the combustion state of the fuel in the combustion chamber 16. If the EGR valve 18 is in failure, even when the EGR valve 18 is controlled, the flow of EGR gas is not changed as expected, the flow amount Ga of intake air flowing in the intake passage 3 is also not changed as expected, and a predicted change does not appear in the combustion state. Accordingly, while the engine 1 is in a predetermined operating state, the ECU 50 determines the presence/absence of changes in combustion state to determine the presence/absence of a failure of the EGR valve 18. This enables effective detection of a failure of the EGR valve 18 without separately providing any additional unit or means for failure detection in the low pressure loop exhaust recirculation apparatus.

To be more specific, during idle operation of the engine 1, the ECU 50 determines the presence/absence of changes in combustion state based on the engine rotation speed NE detected by the rotation speed sensor 52 to determine the presence/absence of open-valve failure of the EGR valve 18. Herein, the rotation speed sensor 52 is used to detect the engine rotation speed NE representing the operating condition of the engine 1 and thus no additional unit or means is necessary to detect failure of the EGR valve 18. This enables effective detection of a failure of the EGR valve 18 during idle operation of the engine 1 without separately providing any additional unit or means for failure detection in the low pressure loop exhaust recirculation apparatus.

Furthermore, the fresh-air induction valve 42 is closed from the valve-open state immediately after the engine 1 enters deceleration operation from EGR ON (the EGR valve 18 is closed) and the changes in combustion state of a fuel in the combustion chamber 16 are judged based on the engine rotation speed NE detected by the rotation speed sensor 52, thereby determining the presence/absence of closed-valve failure of the EGR valve 18. This enables effective detection of a failure of the EGR valve 18 during deceleration operation of the engine 1 without separately providing any additional unit or means for failure detection in the low pressure loop exhaust recirculation apparatus.

The present invention is not limited to the above embodiments and may be embodied in other specific forms without departing from the essential characteristics thereof.

Figure 17:
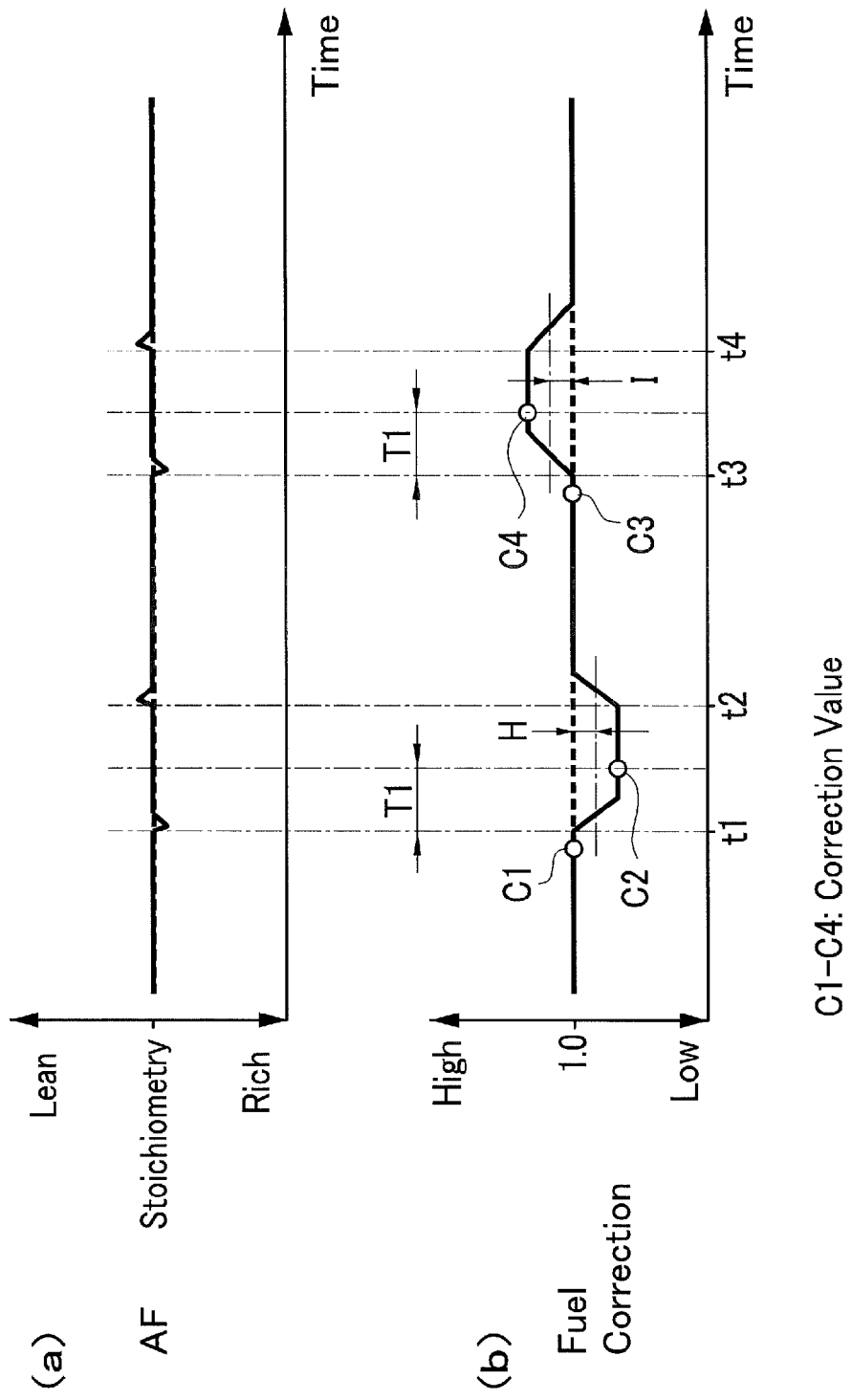
FIG. 17 is a time chart showing behaviors of (a) air-fuel ratio and (b) fuel correction when a EGR valve is normal in another embodiment.

In the fifth and sixth embodiments, it is arranged to detect a failure of the EGR valve 18 based on the presence/absence of the rich-side deviation and the lean-side deviation of the air-fuel ratio AF. As an alternative, in an engine system configured to stoiciometrically control the air-fuel ratio AF, it may be arranged to detect a failure of an EGR valve based on the presence/absence of fuel correction in order to maintain the air-fuel ratio AF at stroiciometry. FIG. 17 is a time chart showing behaviors of (a) air-fuel ratio AF and (b) fuel correction in a case where the EGR valve is normal. In FIG. 17, in a period from time t1 to time t2, it is determined that a rich-side deviation is present when a difference between "correction 1 (C1)" and "correction 2 (C2)" which are values for fuel correction is larger than a predetermined value H. In a period from time t3 to time t4, it is determined that a lean-side deviation is present when a difference between "correction 4 (C4)" and "correction 3 (C3)" which are values for fuel correction is larger than a predetermined value I.

In each of the above embodiments, the failure detection device of the invention is embodied in a gasoline engine system but may also be embodied in a diesel engine.

INDUSTRIAL APPLICABILITY

The present invention is utilizable in for example a vehicle engine irrespective of a gasoline engine or a diesel engine.

Reference Signs List

| | |
|---|---|
| 1 | Engine |
| 3 | Intake passage |
| 3a | Surge tank |
| 5 | Exhaust passage |
| 7 | Supercharger |
| 8 | Compressor |
| 9 | Turbine |
| 10 | Rotary shaft |
| 14 | Electronic throttle device (Intake amount regulating unit) |
| 16 | Combustion chamber |
| 17 | EGR passage (Exhaust recirculation passage) |
| 17a | Outlet |
| 17b | Inlet |
| 18 | EGR valve (Exhaust recirculation valve) |
| 21 | Throttle valve |
| 23 | Throttle sensor (Opening degree detecting unit) |
| 25 | Injector (Fuel supply unit) |
| 41 | Fresh-air induction passage |
| 42 | Fresh-air induction valve |
| 50 | ECU (Failure determining unit) |
| 52 | Rotation speed sensor (Rotation speed detecting unit, Combustion state detecting unit) |
| 54 | Air flow meter (Intake amount measuring unit) |
| 55 | Air-fuel ratio sensor (Air-fuel ratio detecting unit) |

The invention claimed is:

1. A failure detection device for an exhaust recirculation apparatus of an engine with a supercharger,
the engine including an intake passage, an exhaust passage, and an injector configured to supply fuel to a combustion chamber, the intake passage being provided with an intake regulating valve configured to regulate an intake amount of air flowing in the intake passage,
the supercharger including: (i) a compressor disposed in the intake passage upstream of the intake regulating valve, (ii) a turbine disposed in the exhaust passage, and (iii) a rotary shaft connecting the compressor and the turbine to integrally rotate,
the exhaust recirculation apparatus including: (i) exhaust recirculation passage configured to allow part of exhaust gas discharged from the combustion chamber of the engine to the exhaust passage to flow as exhaust recirculation gas to the intake passage to return to the combustion chamber, and (ii) an exhaust recirculation valve configured to regulate a flow of the exhaust recirculation gas in the exhaust recirculation passage, the exhaust recirculation passage having an inlet connected to the exhaust passage downstream of the turbine and an outlet connected to the intake passage upstream of the compressor,
the failure detection device being provided in the exhaust recirculation apparatus of the engine, the failure detection device comprising:
an air flow meter configured to measure the intake amount of air flowing in the intake passage;
a rotation speed sensor configured to detect a rotation speed of the engine;
a throttle sensor configured to detect an opening degree of the intake regulating valve; and
an electronic control unit configured to:
open and close the exhaust recirculation valve based on a predetermined operating condition;
determine a failure in the exhaust recirculation valve based on changes in the intake amount measured by the air flow meter when the exhaust recirculation valve is opened or closed;

when the failure is determined in the exhaust recirculation valve, calculate: (i) an estimated value of the intake amount based on (1) the rotation speed detected by the rotation speed sensor, and (2) the opening degree detected by the throttle sensor, and (ii) an actual measured value of the intake amount by the air flow meter and determine whether the failure of the exhaust recirculation valve occurred in an open state of the exhaust recirculation valve or a closed state of the exhaust recirculation valve by comparing the estimated value and the actual measured value.

2. The failure detection device according to claim 1, wherein when the engine is in a deceleration operation when supply of the fuel by the injector is cut off, the eletronic control unit is configured to: (i) forcibly open and close the exhaust recirculation valve, and (ii) determine that the exhaust recirculation valve is failed based on changes in the intake amount measured by the air flow meter.

3. The failure detection device according to claim 1, wherein when the engine is in a deceleration operation and the supply of the fuel by the injector is cut off, the electronic control unit is configured to: (i) forcibly close the exhaust recirculation valve from a valve open state and forcibly open the intake regulating valve to a predetermined opening degree, and (ii) determine the failure in the exhaust recirculation valve based on changes in the intake amount measured by the air flow meter.

4. The failure detection device according to claim 1, wherein when the engine is in a steady operation, the electronic control unit is configured to: (i) forcibly open and close the exhaust recirculation valve, and (ii) determine the failure in the exhaust recirculation valve based on changes in the intake amount measured by the air flow meter.

5. The failure detection device according to claim 1, wherein when the engine is in a steady operation, the electronic control unit is programmed to: (i) determine the failure in the exhaust recirculation valve under: (1) a first condition in which the exhaust recirculation valve is open at a predetermined opening degree or more, and (2) a second condition in which the exhaust recirculation valve is open at less than the predetermined opening degree, and (ii) determine that the exhaust recirculation valve is normal when the failure of the exhaust recirculation valve is not determined under both the first condition and the second condition.

6. The failure detection device according to claim 1, further including an air-fuel ratio sensor configured to detect an air-fuel ratio between air and fuel supplied to the combustion chamber in order to detect an operating condition of the engine, wherein when the engine is in a steady operation, the electronic control unit is configured to: (i) forcibly open and close the exhaust recirculation valve, and (ii) determine the failure of the exhaust recirculation valve based on changes in the air-fuel ratio detected by the air-fuel ratio sensor.

7. A failure detection device for an exhaust recirculation apparatus of an engine with a supercharger, the engine including an intake passage, an exhaust passage, and an injector configured to supply fuel to a combustion chamber, the intake passage being provided with an intake regulating valve configured to regulate an intake amount of air flowing in the intake passage, the supercharger including: (i) a compressor disposed in the intake passage upstream of the intake regulating valve, (ii) a turbine disposed in the exhaust passage, and (iii) a rotary shaft connecting the compressor and the turbine to integrally rotate, the exhaust recirculation apparatus including: (i) an exhaust recirculation passage configured to allow part of exhaust gas discharged from the combustion chamber of the engine to the exhaust passage to flow as exhaust recirculation gas to the intake passage to return to the combustion chamber, and (ii) an exhaust recirculation valve configured to regulate a flow of the exhaust recirculation gas in the exhaust recirculation passage, the exhaust recirculation passage having an inlet connected to the exhaust passage downstream of the turbine and an outlet connected to the intake passage upstream of the compressor, the failure detection device being provided in the exhaust recirculation apparatus of the engine, the failure detection device comprising:

an air flow meter configured to measure the intake amount of air flowing in the intake passage;

a rotation speed sensor configured to detect a combustion state of the fuel in the combustion chamber;

a throttle sensor configured to detect an opening degree of the intake regulating valve; and an electronic control unit configured to:

determine a failure of the exhaust recirculation valve based on changes in a combustion state of the fuel in the combustion chamber supplied by the injector while the engine is in a predetermined operating condition;

when the failure is determined in the exhaust recirculation valve, calculate: (i) an estimated value of the intake amount based on (1) the combustion state detected by the rotation speed sensor, and (2) the opening degree detected by the throttle sensor, and (ii) an actual measured value of the intake amount by the air flow meter; and determine whether the failure of the exhaust recirculation valve occurred in an open state of the exhaust recirculation valve or a closed state of the exhaust recirculation valve by comparing the estimated value and the actual measured value.

8. The failure detection device according to claim 7, wherein when the engine is during idle operation, the electronic control unit is configured to determine the failure of the exhaust recirculation valve based on changes in combustion state of the fuel detected by the rotation speed sensor.

9. The failure detection device according to claim 7, further comprising:

a fresh-air induction passage configured to introduce fresh air to the intake passage downstream of the intake regulating value; and a fresh-air induction valve configured to regulate fresh air flowing in the fresh-air induction passage, wherein the electronic control unit is configured to determine the failure of the exhaust recirculation valve based on changes in the combustion state of the fuel detected by the rotation speed sensor when the fresh-air induction valve is closed from a valve-open state immediately after the engine enters deceleration operation.

* * * * *